(12) United States Patent
Yanagihara et al.

(10) Patent No.: US 12,586,839 B2
(45) Date of Patent: Mar. 24, 2026

(54) BATTERY MODULE WITH IMPROVED COOLING PERFORMANCE, BATTERY DEVICE INCLUDING SAID BATTERY MODULE, AND METHOD FOR MANUFACTURING SAID BATTERY MODULE

(71) Applicant: AESC JAPAN LTD., Kanagawa (JP)

(72) Inventors: Yasuhiro Yanagihara, Kanagawa (JP); Masayuki Nakai, Kanagawa (JP)

(73) Assignee: AESC JAPAN LTD., Kanagawa (JP)

( * ) Notice: Subject to any disclaimer, the term of this patent is extended or adjusted under 35 U.S.C. 154(b) by 197 days.

(21) Appl. No.: 17/906,681

(22) PCT Filed: Oct. 21, 2021

(86) PCT No.: PCT/JP2021/038934
§ 371 (c)(1),
(2) Date: Sep. 19, 2022

(87) PCT Pub. No.: WO2022/085764
PCT Pub. Date: Apr. 28, 2022

(65) Prior Publication Data
US 2023/0335829 A1 Oct. 19, 2023

(30) Foreign Application Priority Data
Oct. 22, 2020 (JP) ................................. 2020-177608

(51) Int. Cl.
*H01M 10/65* (2014.01)
*H01M 10/613* (2014.01)
(Continued)

(52) U.S. Cl.
CPC ..... *H01M 10/6555* (2015.04); *H01M 10/613* (2015.04); *H01M 10/653* (2015.04); *H01M 10/6551* (2015.04)

(58) Field of Classification Search
CPC ......... H01M 10/6555; H01M 10/6554; H01M 10/6556; H01M 10/613; H01M 10/615;
(Continued)

(56) References Cited

U.S. PATENT DOCUMENTS

2017/0200995 A1    7/2017  Phlegm et al.
2017/0358784 A1*  12/2017  Jeong .................. H01M 50/262
2020/0194854 A1*   6/2020  Ahn .................. H01M 10/6556

FOREIGN PATENT DOCUMENTS

CN        202585590 U    12/2012
CN        106953136 A    7/2017
(Continued)

OTHER PUBLICATIONS

International Search Report dated Dec. 14, 2021 filed in PCT/JP2021/038934.

*Primary Examiner* — Raymond Alejandro
(74) *Attorney, Agent, or Firm* — Rankin, Hill & Clark LLP

(57) ABSTRACT
A battery module is configured so that cooling performance can be improved. The battery module includes multiple battery cells stacked on each other, a spacer provided at an end portion of each battery cell, and heat transfer plates each of which has a heat absorption portion arranged between the multiple battery cells stacked on each other to absorb heat from the battery cells and a heat dissipation portion dissipating the heat absorbed by the heat absorption portion to the outside. The heat dissipation portion is bent relative to the heat absorption portion 20*a*, and is exposed through between the battery cells to contact the spacer. The spacer includes contact portions having contact surfaces contacting the heat dissipation portion, and a positioning portion having a surface facing a direction opposite to that of the contact surface and defining the position of the spacer.

11 Claims, 18 Drawing Sheets

(51) Int. Cl.
    *H01M 10/653*     (2014.01)
    *H01M 10/6551*     (2014.01)
    *H01M 10/6555*     (2014.01)
(58) Field of Classification Search
    CPC ............. H01M 10/617; H01M 10/653; H01M
                                10/6551; H01M 10/655
    See application file for complete search history.

(56)                 References Cited

FOREIGN PATENT DOCUMENTS

| CN | 107482143 | A  | 12/2017 |
|----|-----------|----|---------|
| CN | 208690351 | U  | 4/2019  |
| EP | 3255703   | A1 | 12/2017 |
| EP | 3614452   | A1 | 2/2020  |
| JP | 2012-248299 | A | 12/2012 |
| JP | 2018-041583 | A | 3/2018 |
| KR | 20140042059 | A | 4/2014 |
| WO | 2019/123903 | A1 | 6/2019 |

* cited by examiner

BATTERY MODULE WITH IMPROVED COOLING PERFORMANCE, BATTERY DEVICE INCLUDING SAID BATTERY MODULE, AND METHOD FOR MANUFACTURING SAID BATTERY MODULE

TECHNICAL FIELD

The present invention relates to a battery module, a battery device, and a method for manufacturing the battery module.

BACKGROUND ART

For example, a battery module disclosed in Patent Literature 1 has multiple battery cells held in cell holders, and these battery cells are arranged through heat transfer plates. The heat transfer plate has a first portion inserted and interposed between adjacent ones of the battery cells and a second portion exposed to the outside of the battery module and facing a side wall of the cell holder. The first portion of the heat transfer plate is bonded to the battery cell provided in the cell holder in such arrangement that the second portion contacts the side wall of the cell holder. The cell holders provided with the heat transfer plates are arranged and stacked on each other, and are held with a holding member. In this manner, an integrated arrangement is obtained.

The arrangement is fixed to a wall portion of a metal housing that houses the battery module through a thermal conductive member. The thermal conductive member is compressed by the arrangement and the wall portion of the housing, and closely contacts the second portions of the heat transfer plates and the wall portion. Heat generated in the battery cell is dissipated to the housing through the heat transfer plate and the thermal conductive member.

CITATION LIST

Patent Literature

PATENT LITERATURE 1: JP-A-2018-41583

SUMMARY OF INVENTION

Problems to be Solved by the Invention

In the battery module described in Patent Literature 1, the second portion of the heat transfer plate is positioned so as to contact the side wall of the cell holder before stacking of the cell holders. Thereafter, the multiple cell holders provided with the heat transfer plates are stacked on each other. Thus, when the multiple cell holders are stacked on each other, there is a probability that the position shift of the cell holders is caused. For this reason, the positions of the second portions of the multiple heat transfer plates easily become uneven relative to the opposing thermal conductive member. If the positions of the second portions pressed by the thermal conductive member are uneven, there is a problem that the surface pressure of the second portion varies and cooling performance varies according to the cell holder.

Solution to Problems (1) A battery module according to a first aspect of the present invention includes: multiple battery cells stacked on each other; a spacer provided at an end portion of each battery cell; and a heat transfer plate having a heat absorption portion arranged between the multiple battery cells stacked on each other to absorb heat from the battery cells and a heat dissipation portion dissipating the heat absorbed by the heat absorption portion to an outside, in which the heat dissipation portion is bent relative to the heat absorption portion, and is exposed through between the battery cells to contact the spacer, and the spacer includes a contact portion having a contact surface contacting the heat dissipation portion, and a positioning portion having a surface facing a direction opposite to that of the contact surface and defining a position of the spacer 12.

(2) A battery device according to a second aspect of the present invention includes: the battery module; and a cooling member pressed against heat dissipation portions of multiple heat transfer plates provided in the battery module through a thermal conductive sheet to absorb heat from the heat dissipation portions.

(3) A method for manufacturing a battery module according to a third aspect of the present invention includes multiple battery cells stacked on each other, multiple heat transfer plates, each of which is arranged between adjacent ones of the battery cells stacked on each other, and a spacer provided at an end portion of each battery cell, each heat transfer plate having a heat absorption portion arranged between adjacent ones of the battery cells stacked on each other and a heat dissipation portion exposed so as to bend to an outside of the battery cells stacked on each other and facing the spacer, the method including: a first step of stacking the multiple battery cells and the multiple heat transfer plates; and a second step of collectively pressing, after the first step, the multiple heat dissipation portions toward the spacer by a pressing tool, thereby causing each heat dissipation portion to contact the opposing spacer to align positions of the multiple spacers and align positions of the multiple heat dissipation portions.

Effects of Invention

According to the present invention, the cooling performance of the battery module can be improved.

BRIEF DESCRIPTION OF DRAWINGS

FIG. 3 shows a view of part of a battery device.

FIG. 17 shows a view of a third step of the steps of manufacturing the battery module.

DESCRIPTION OF EMBODIMENTS

Figure 1:
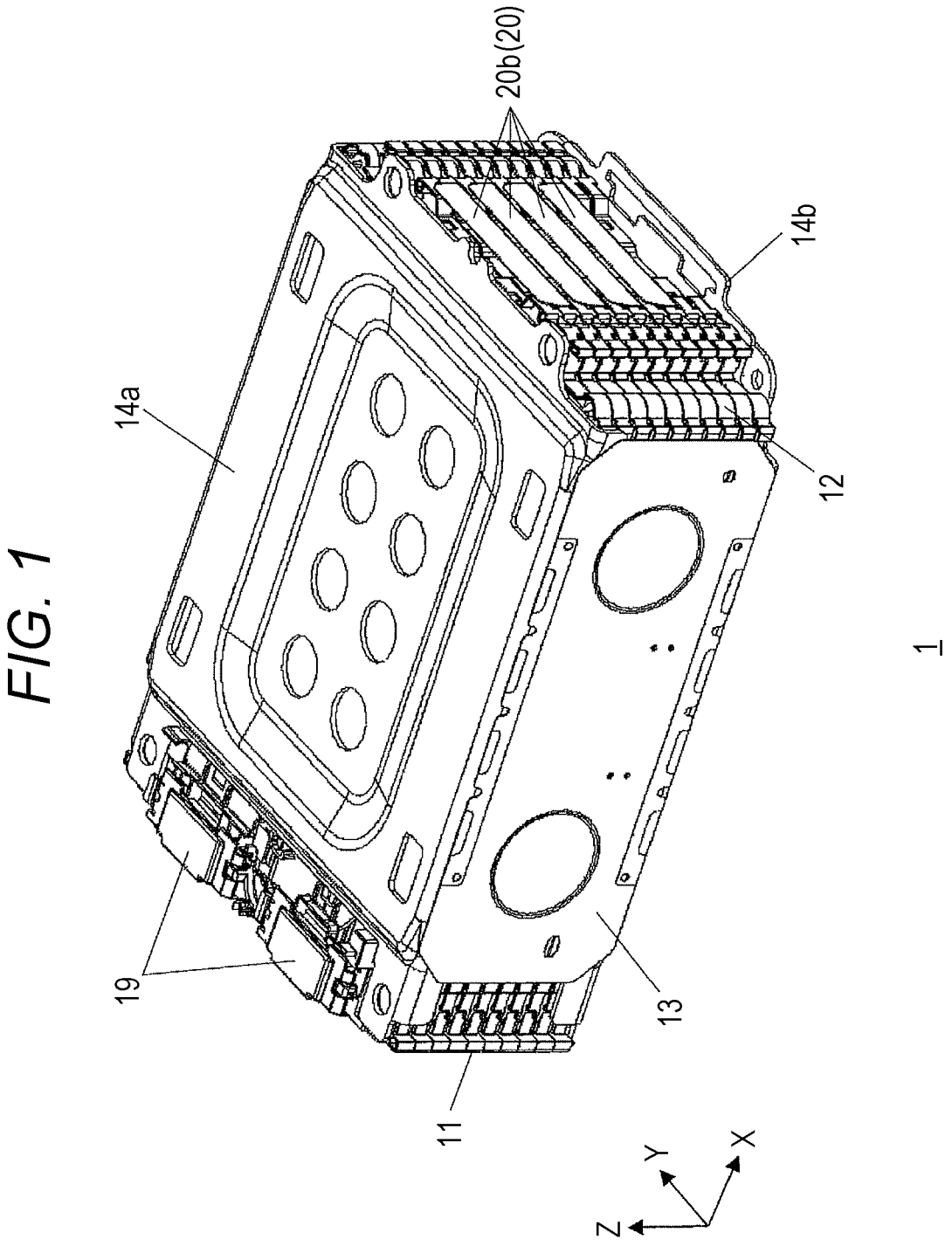
FIG. 1 shows a perspective view of a battery module of the present embodiment.

Hereinafter, an embodiment of the present invention will be described with reference to the drawings. Note that in description of the drawings, the same reference numerals are used to represent the same elements and overlapping description thereof will be omitted. For the sake of convenience in description, the size and ratio of each member in the drawings is exaggerated and is different from actual size and ratio in some cases. Note that in XYZ coordinates shown in each figure, an X-direction indicates a direction along a longitudinal direction of a battery cell provided in a battery module, a Y-direction indicates a direction along a lateral direction of the battery cell, and a Z-direction indicates a battery cell stack direction.

Figure 2:
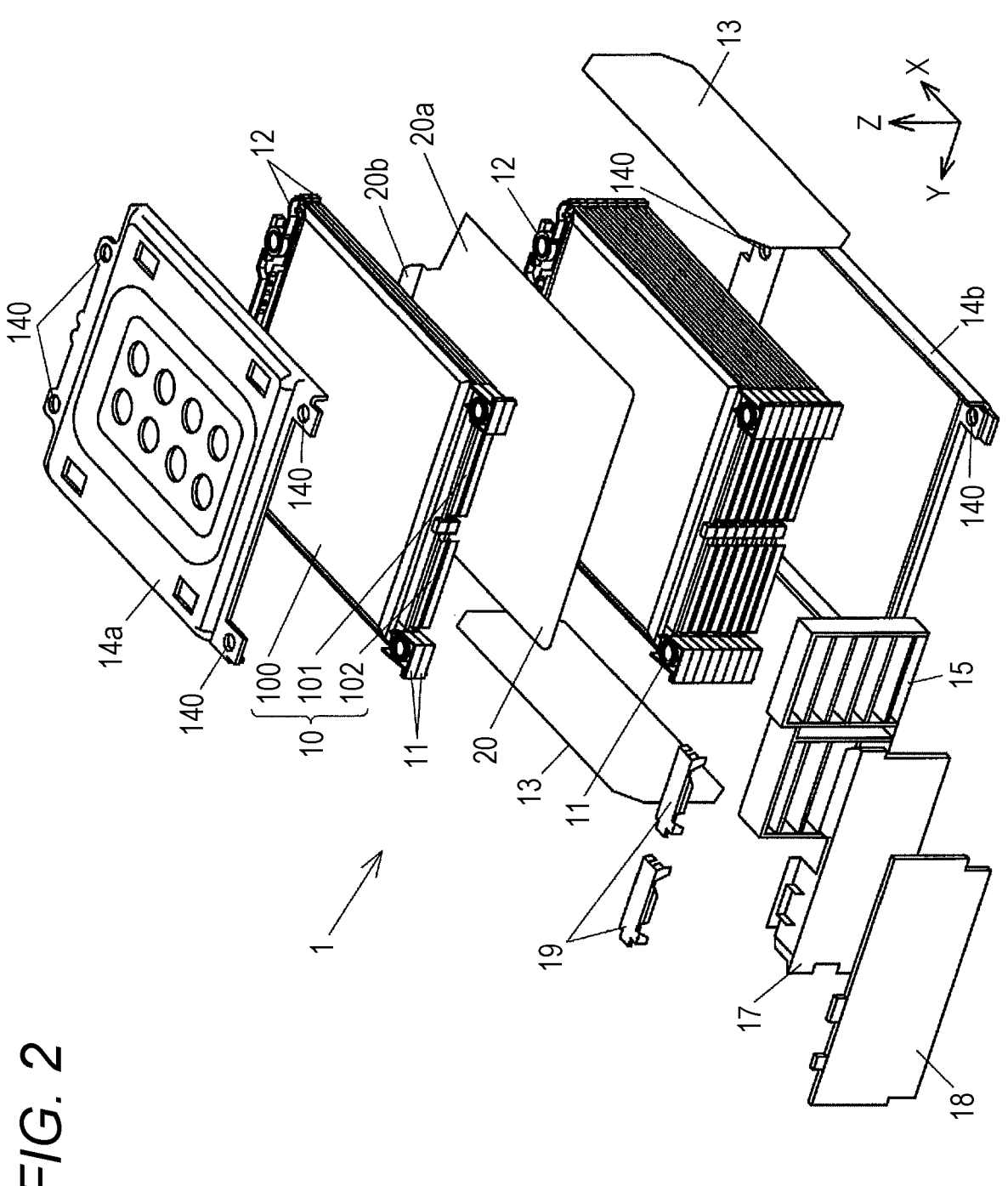
FIG. 2 shows an exploded perspective view of the battery module.

FIG. 1 is a perspective view of a battery module 1 of the present embodiment. FIG. 2 is an exploded perspective view of the battery module 1 shown in FIG. 1. In a case where the battery module 1 shown in FIG. 1 is mounted on, e.g., a vehicle such as an electric vehicle, the number of battery modules 1 corresponding to the vehicle and a sensor, a controller and the like for monitoring and controlling each battery module 1 are, as a power source device (also called a battery pack) housed in a case corresponding to the vehicle, mounted on the vehicle.

The battery module 1 includes multiple battery cells (also called cells) 10 stacked on each other. In an example shown in FIGS. 1 and 2, ten battery cells 10 are stacked on each other in the Z-direction. Note that the number of battery cells 10 is not limited to above. The battery cell 10 includes a cell body 100, a positive electrode tab 101, and a negative electrode tab 102. A spacer 11 is attached to one end of the battery cell 10 in the longitudinal direction thereof, and a spacer 12 is attached to the other end of the battery cell 10 in the longitudinal direction thereof. The pair of spacers 11, 12 attached to the battery cell 10 is members defining an interval of stacking the battery cells 10 on each other, i.e., an interval in the Z-direction. Hereinafter, a side of the battery cell 10 to which the spacer 11 is attached will be referred to as a front side, and a side of the battery cells 10 to which the spacer 12 is attached will be referred to as a rear side. Details of the spacers 11, 12 will be described later.

Side wall plates 13 are each provided on both side surfaces of the battery module 1 in the Y-direction. A pressure plate 14*a* is provided on a top surface of the battery module 1 in the Z-direction, and a pressure plate 14*b* is provided on a bottom surface of the battery module 1 in the Z-direction. A bus bar module 15 is provided on a front surface of the battery module 1 at which the spacers 11 are provided. Four through-holes 140 are formed at the pressure plate 14*a*, 14*b*. Through-bolts 22 (see FIG. 3) for fixing the battery module 1 to a power source device housing are each inserted into these through-holes 140. The side wall plates 13 forming part of a housing of the battery module 1 are welded to side surfaces of the pressure plates 14*a*, 14*b* in a state in which a stack of the multiple battery cells 10 with the spacers 11, 12 and multiple heat transfer plates 20 is pressurized by the top and bottom pressure plates 14*a*, 14*b*.

The bus bar module 15 is connected to multiple bus bars (not shown) provided in the stack of the battery cells 10. Note that details of the bus bar will be described later. A terminal 17 is provided on the front side of the bus bar module 15, and a resin cover 18 is further attached to the front side of the terminal 17. A pair of terminal covers 19 is provided on a top surface of the terminal 17. The stack of the battery cells 10 is provided with the multiple heat transfer plates 20 for cooling the battery cells 10. The heat transfer plate 20 has an L-shape, and includes a heat absorption portion 20*a* inserted into between the battery cells 10 and a heat dissipation portion 20*b* exposed on the rear side of the stack of the battery cells 10. The heat absorption portion 20*a* is arranged so as to be sandwiched between the cell bodies 100 of the battery cells 10 stacked one above the other. Heat generated at the cell body 100 is transmitted from the cell body 100 to the heat absorption portion 20*a*.

Figure 3:
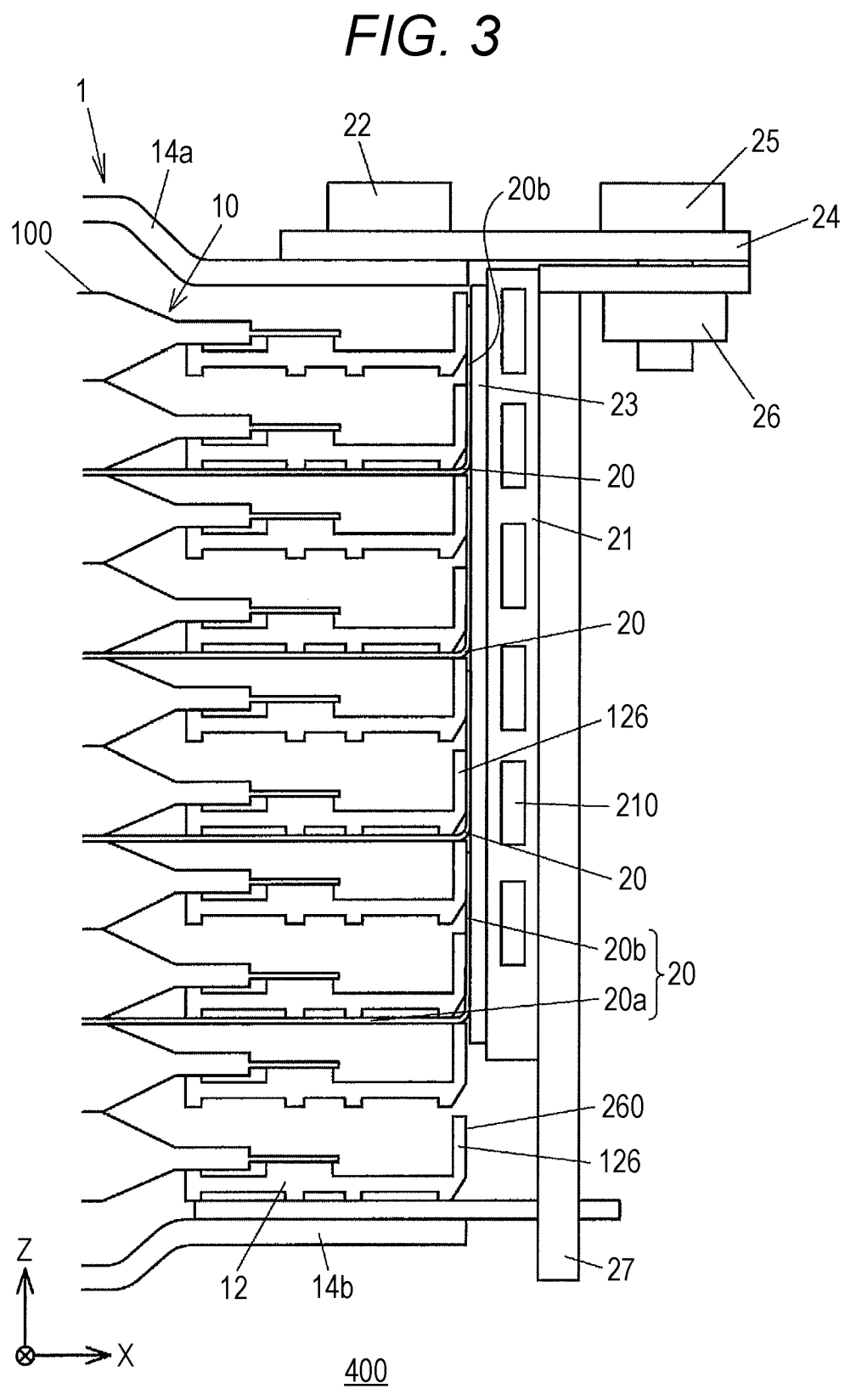

When the power source device provided with the battery modules 1 is mounted on the vehicle, a cooling member for taking heat from each heat transfer plate 20 is provided. FIG. 3 is a view showing part of a battery device 400. In the battery device 400, a cooling plate 21 to be cooled with refrigerant is attached to the battery module 1. As shown in FIG. 3, ten battery cells 10 are stacked on each other in the battery module 1. Four heat transfer plates 20 are arranged such that each heat transfer plate 20 is positioned between adjacent ones of the battery cells 10 stacked on each other. The heat transfer plates 20 are provided between the second battery cell 10 and the third battery cell 10 from the bottom, between the fourth battery cell 10 and the fifth battery cell 10 from the bottom, between the sixth battery cell 10 and the seventh battery cell 10 from the bottom, and between the eighth battery cell 10 and the ninth battery cell 10 from the bottom. Note that although not shown in the figure, the battery cells 10 stacked one above the other are bonded to each other with an adhesive, and the battery cell 10 and the heat absorption portion 20*a* of the heat transfer plate 20 are bonded to each other with an adhesive. The L-shaped heat transfer plate 20 is arranged such that the heat dissipation portion 20*b* thereof is exposed so as to bend upwardly from a stack region as viewed in the figure and faces heat transfer plate contact portions 126 of the spacer 12. The heat transfer plate 20 is positioned such that the heat dissipation portion 20*b* thereof closely contacts contact surfaces 260 of the heat transfer plate contact portions 126. Note that the number of heat transfer plates 20 and the stack positions of the heat transfer plates 20 are not limited to those in the configuration of FIG. 3.

The battery module 1 is fixed to the not-shown power source device housing with the through-bolts 22. The cooling plate 21 is pressed toward the heat dissipation portions 20*b* of the heat transfer plates 20 by a retainer 27. The retainer 27 is fixed to a bracket 24 with a bolt 25 and a nut 26. The bracket 24 is fixed to the battery module 1 with the through-bolts 22. A thermal conductive sheet 23 having a thickness of about 1 to 2 mm is provided so as to be sandwiched between the cooling plate 21 and the heat dissipation portion 20*b* of each heat transfer plate 20. The thermal conductive sheet 23 is a thermal conductive member for absorbing heat from the multiple heat dissipation portions 20*b* unevenly positioned in the X-direction, and is generally called a thermal interface material. An elastic material having excellent thermal conductivity is used for the thermal conductive sheet 23.

The cooling plate 21 is pressed against the heat dissipation portions 20*b* of the heat transfer plates 20 through the thermal conductive sheet 23, and accordingly, heat of the heat transfer plates 20 is released to the cooling plate 21 through the thermal conductive sheet 23. A refrigerant flow path 210 is formed in the cooling plate 21. The heat having moved from the heat transfer plates 20 to the cooling plate 21 is dissipated to refrigerant flowing in the refrigerant flow path 210.

Figure 4:
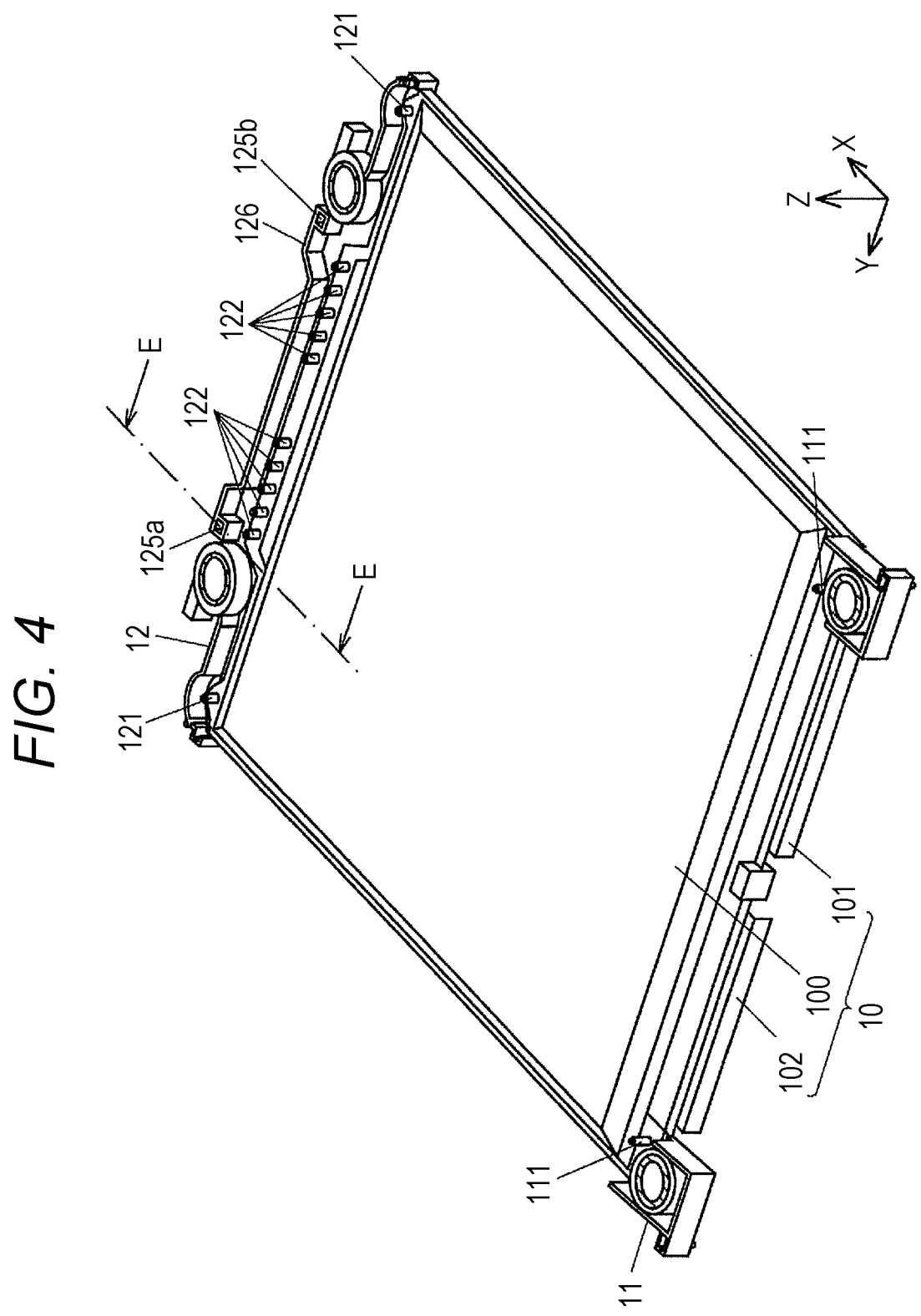
FIG. 4 shows a perspective view of a battery cell to which spacers are attached.

FIG. 4 is a perspective view of the battery cell 10 to which the spacers 11, 12 are attached. As described above, the battery cell 10 includes the cell body 100 and the positive electrode tab 101 and the negative electrode tab 102 provided so as to be exposed on the front side of the cell body 100. The spacer 11 is attached to a front end portion of the battery cell 10, and the spacer 12 is attached to a rear end portion of the battery cell 10. The spacers 11, 12 are formed of resin members.

Figure 5:
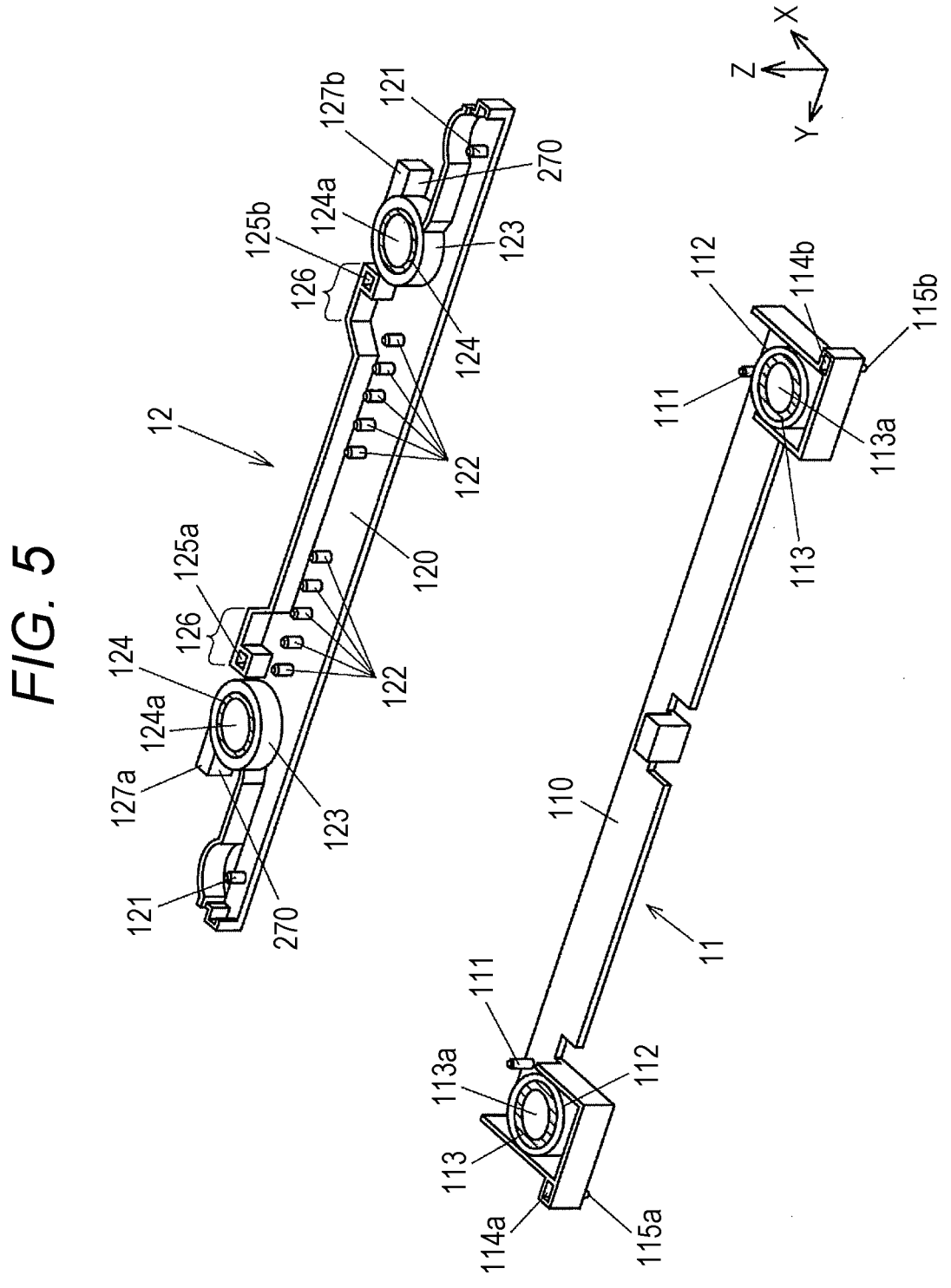
FIG. 5 shows a perspective view of the top side of the spacer.
Figure 6:
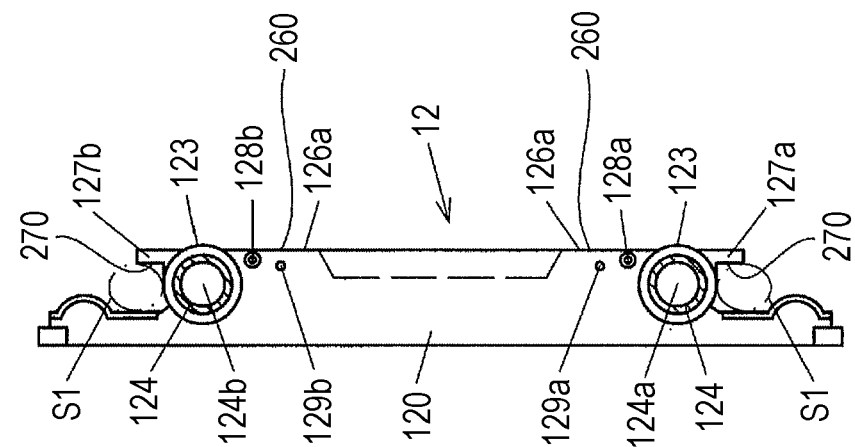
FIG. 6 shows a view of the bottom side of the spacer.
Figure 6:
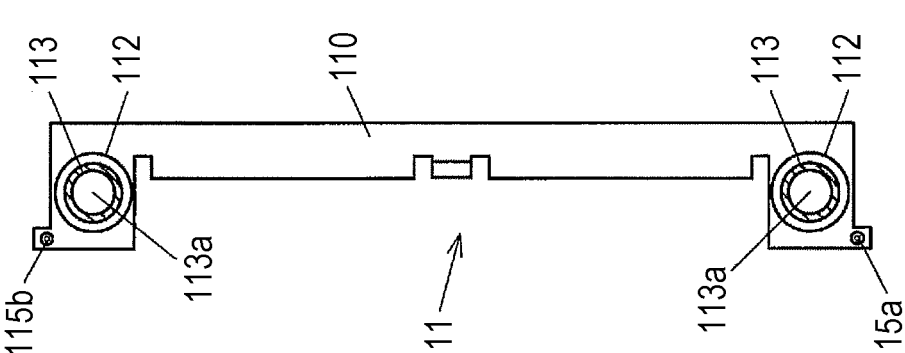

FIGS. 5 and 6 are views showing the spacers 11, 12. FIG. 5 is a perspective view showing the top side of the spacers 11, 12. FIG. 6 is a view showing the bottom side of the spacers 11, 12. The spacer 11 includes a cell support portion 110 extending in the Y-direction and a pair of stack portions 112 provided at both ends of the cell support portion 110. A pair of coupling pins 111 is formed on a top surface of the cell support portion 110. Metal collars 113 formed with through-holes 113*a* are each inserted into the stack portions 112. The through-bolts 22 (see FIG. 3) for fixing the battery module 1 to the power source device housing are each inserted into the through-holes 113*a* of the metal collars 113.

Recessed portions 114*a*, 114*b* are formed on the top side at both ends of the spacer 11 in the Y-direction. Moreover, raised portions 115*a*, 115*b* are, on the bottom side of the spacer 11, formed corresponding to the recessed portions 114*a*, 114*b* at both ends of the spacer 11 in the Y-direction (see FIG. 6). The recessed portion 114*a* and the raised portion 115*a* are formed substantially on the same axis in the Z-direction. Similarly, the recessed portion 114*b* and the raised portion 115*b* are formed substantially on the same axis in the Z-direction. When the battery cells 10 to which the spacers 11 are attached are stacked on each other, the raised portions 115*a* are inserted into the recessed portions 114*a*, and the raised portions 115*b* are inserted into the recessed portions 114*b*.

The spacer 12 includes a cell support portion 120 extending in the Y-direction and a pair of stack portions 123. A pair of coupling pins 121 and ten coupling pins 122 are formed on a top surface of the cell support portion 120. Metal collars 124 formed with through-holes 124*a* are each inserted into the stack portions 123. The through-bolts 22 shown in FIG. 3 are each inserted into the through-holes 124*a* of the metal collars 124. As shown in FIG. 5, the pair of heat transfer plate contact portions 126 is formed at an end portion of the spacer 12 in the positive X-direction. As shown in FIG. 3, the heat transfer plate 20 is positioned such that an inner surface of a standing wall of the heat dissipation portion 20*b* closely contacts the contact surfaces 260 as outer wall surfaces of the heat transfer plate contact portions 126.

Recessed portions 125*a*, 125*b* are formed on the top side of the spacer 12. Moreover, as shown in FIG. 6, raised portions 128*a*, 128*b* are, on the bottom side of the spacer 12, formed corresponding to the recessed portions 125*a*, 125*b*. The recessed portion 125*a* and the raised portion 128*a* are formed substantially on the same axis in the Z-direction. Similarly, the recessed portion 125*b* and the raised portion

128*b* are formed substantially on the same axis in the Z-direction. When the battery cells 10 are stacked on each other, the raised portions 128*a* are inserted into the recessed portions 125*a*, and the raised portions 128*b* are each inserted into the recessed portions 125*b*. Moreover, on the bottom side of the spacer 12, raised portions 129*a*, 129*b* used for rough positioning of the heat transfer plate 20 are formed.

At an outer peripheral surface of the spacer 12, a pair of protrusions 127*a*, 127*b* is formed so as to protrude to both sides of the spacer 12 in the Y-direction. In FIG. 5, the protrusion 127*a* protrudes in the positive Y-direction with respect to the center of the spacer 12. The protrusion 127*b* protrudes in the negative Y-direction with respect to the center of the spacer 12. The protrusions 127*a*, 127*b* are positioning protrusions used for aligning the positions of the spacers 12 in a state in which the multiple battery cells 10 are stacked on each other. A positioning method using the protrusions 127*a*, 127*b* will be described later.

As shown in FIG. 6, the directions of front (the negative X-direction) surfaces 270 of the protrusions 127*a*, 127*b*, i.e., the direction of the normal vector of the surface 270, are opposite to the directions of the contact surfaces 260 contacting the heat dissipation portion 20*b* of the heat transfer plate 20. As described later, a positioning tool contacts each of the surfaces 270 of the spacers 12 for the battery cells 10 stacked on each other, and in this manner, the positions of the spacers 12 are aligned. That is, the surface 270 functions as a positioning reference surface of the spacer 12 in a stacked state. A space S1 where the tool is arranged is ensured on the front side (the negative X-direction) of the surface 270.

Figure 7:
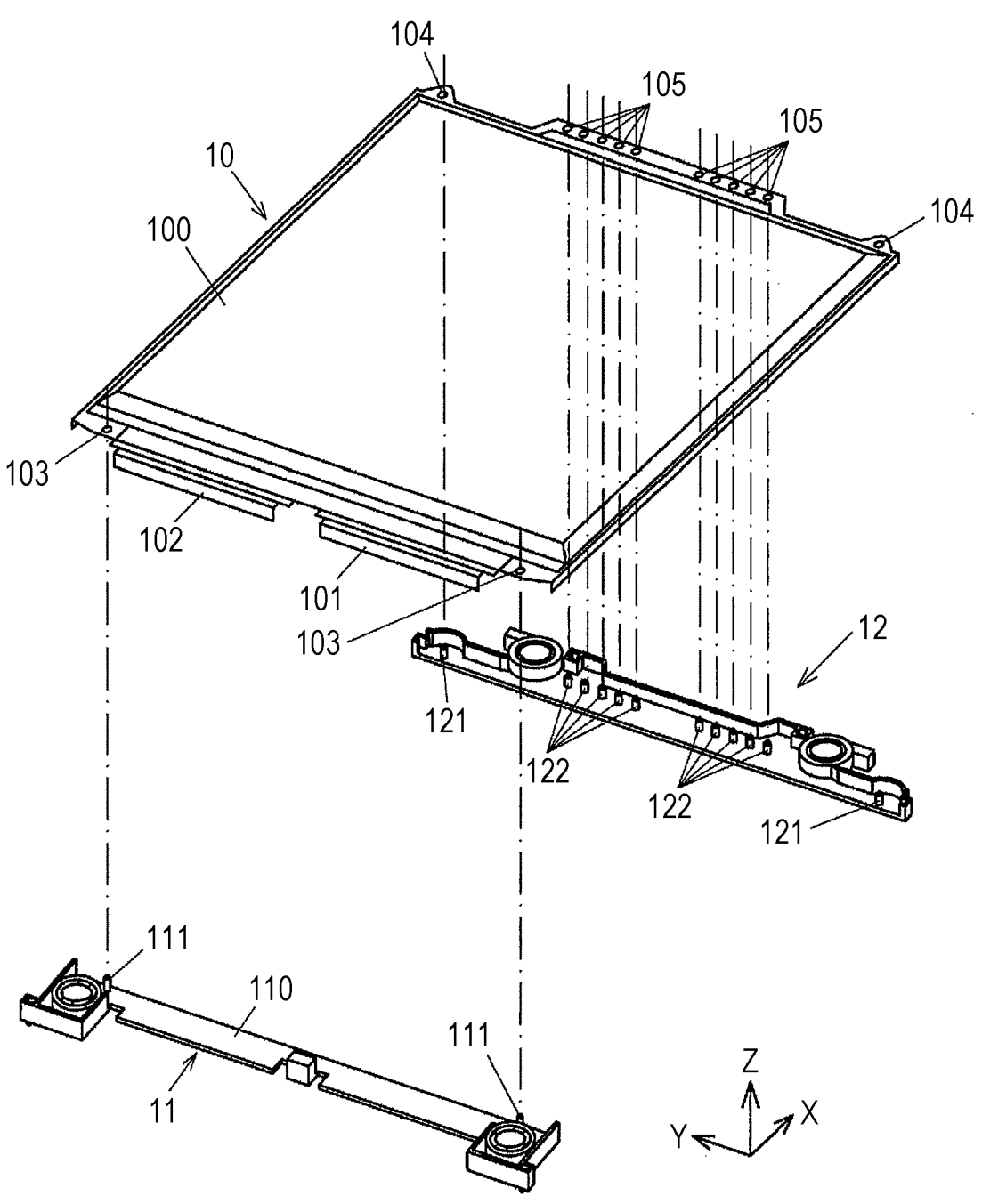
FIG. 7 shows a view of a cell body and a pair of spacers.

FIG. 7 is a view showing the cell body 100 and the pair of spacers 11, 12 attached to both ends of the cell body 100 in the longitudinal direction thereof. The cell body 100 is a flat lithium ion secondary battery configured such that a power generating element is sealed in a laminated film bag. The cell body 100 is provided with the thin plate-shaped positive electrode tab 101 and the thin-plate shaped negative electrode tab 102. The positive electrode tab 101 and the negative electrode tab 102 are electrically connected to the power generating element, and are drawn from the laminated film container of the cell body 100 to the outside.

A pair of coupling holes 103 is formed at a front end portion of the laminated film bag of the cell body 100, and the coupling pins 111 formed at the front spacer 11 are each inserted into the coupling holes 103. A pair of coupling holes 104 is formed at a rear end portion of the laminated film bag of the cell body 100, and the pair of coupling pins 121 formed at both ends of the rear spacer 12 is each inserted into the coupling holes 104. Further, ten coupling holes 105 are formed at a center portion of the rear end portion of the laminated film bag of the cell body 100, and the coupling pins 122 formed at a center portion of the spacer 12 are each inserted into the coupling holes 105.

The spacers 11, 12 are formed of the resin members. The coupling pins 111 inserted into the coupling holes 103 of the cell body 100 are thermally caulked, and in this manner, the spacer 11 is fixed to the front side of the cell body 100. Similarly, the coupling pins 121 inserted into the coupling holes 104 of the cell body 100 and the coupling pins 122 inserted into the coupling holes 105 are thermally caulked, and in this manner, the spacer 12 is fixed to the rear side of the cell body 100. The positive electrode tab 101 and the negative electrode tab 102 are exposed on a spacer 11 side.

In an example shown in FIG. 3, the heat transfer plates 20 are provided between the second battery cell 10 and the third battery cell 10 from the bottom, between the fourth battery cell 10 and the fifth battery cell 10 from the bottom, between the sixth battery cell 10 and the seventh battery cell 10 from the bottom, and between the eighth battery cell 10 and the ninth battery cell 10 from the bottom. Before the battery cells 10 are stacked on each other, the heat absorption portion 20a of the heat transfer plate 20 is bonded to the bottom side (a lower surface as viewed in the figure) of the cell body 100 of the battery cell 10.

Figure 8:
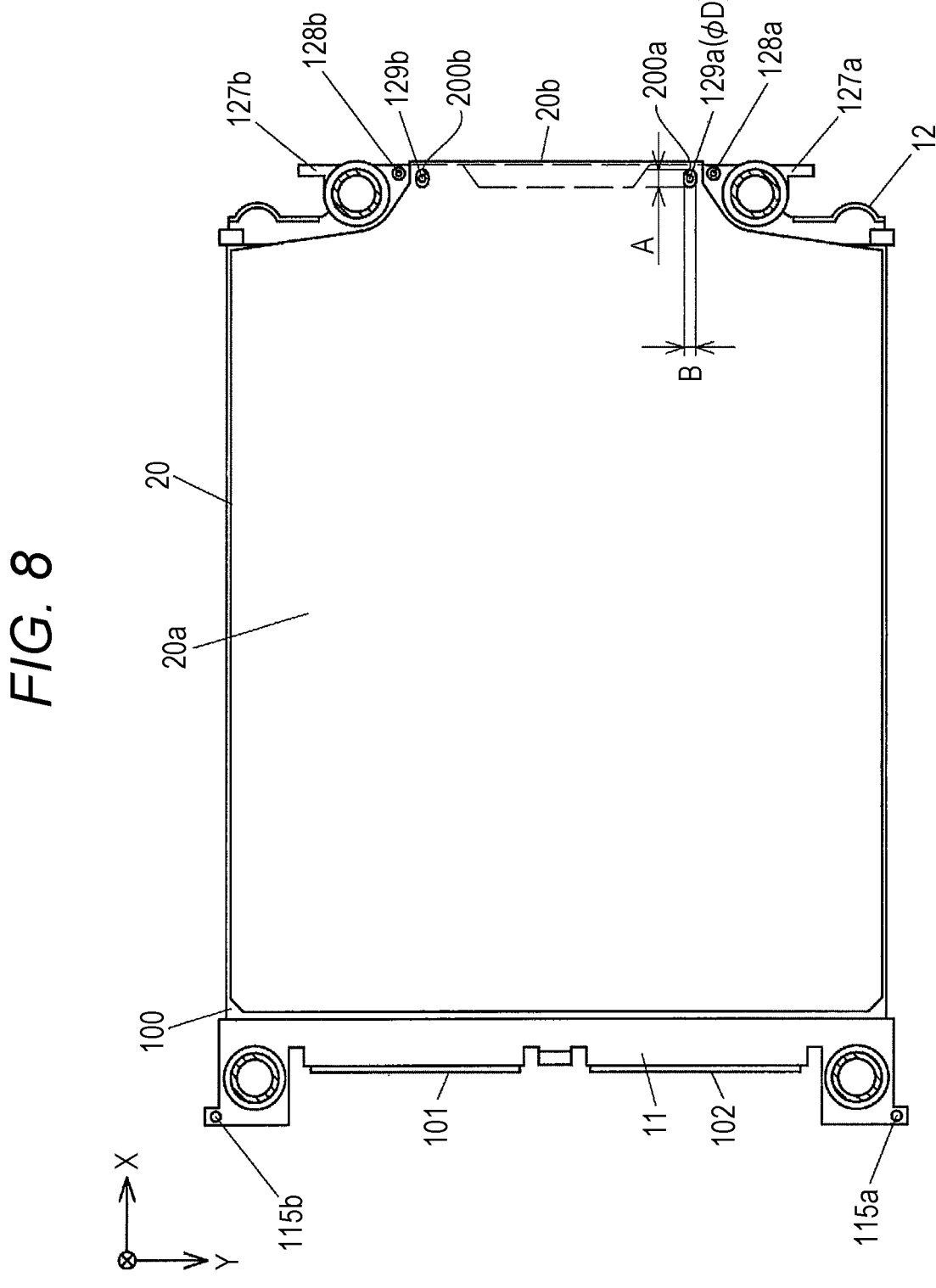
FIG. 8 shows a view of a heat transfer plate attached to the bottom side of the battery cell.

FIG. 8 is a view showing the heat transfer plate 20 attached to the bottom side of the cell body 100. The heat transfer plate 20 is made of metal having excellent thermal conductivity, such as copper or aluminum. As described above, the L-shaped heat transfer plate 20 includes the heat absorption portion 20a inserted into between the battery cells 10 and the heat dissipation portion 20b exposed on the rear side of the stack and contacting the heat transfer plate contact portions 126 of the spacer 12. The heat absorption portion 20a of the heat transfer plate 20 is formed with through-holes 200a, 200b for positioning. The raised portions 129a, 129b formed on the bottom side of the spacer 12 are inserted into the through-holes 200a, 200b, and in this manner, rough positioning of the heat transfer plate 20 relative to the spacer 12 is performed.

[Positioning Mechanisms in Battery Module 1]

Next, positioning mechanisms in the battery module 1 of the present embodiment will be described. For delivering performance of the battery module 1, it is necessary to efficiently dissipate heat generated due to heat generation of the cell bodies 100. In the present embodiment, part (the heat dissipation portions 20b) of the heat transfer plates 20 provided in the stack of the battery cells 10 is exposed to the outside of the stack, thereby dissipating heat from the heat dissipation portions 20b to the cooling plate 21 through the thermal conductive sheet 23. As described above, the thermal conductive sheet 23 is generally called a thermal interface material. The thermal interface material has a function of filling small clearance and recessed-raised portion between a heat generation device and a heat sink to efficiently transmit heat to the heat sink. The thermal conductive sheet 23 in the present embodiment absorbs heat from the multiple heat dissipation portions 20b unevenly positioned in the X-direction to efficiently transmit heat of the heat transfer plates 20 to the cooling plate 21. The thickness of the thermal conductive sheet 23 is set to such a thickness that heat from the unevenly-positioned heat dissipation portions 20b can be absorbed. The thickness of the thermal conductive sheet 23 is preferably smaller for suppressing the thermal resistance of the thermal conductive sheet 23 itself low. In the present embodiment, the thickness of the thermal conductive sheet 23 is about 1 to 2 mm.

If X-direction position shift among the battery cells 10 stacked on each other and the position shift of the heat transfer plate 20 relative to the battery cell 10 in the X-direction are great, the positions of the heat dissipation portions 20b are uneven relative to the thermal conductive sheet 23. In a case where the positions of the heat dissipation portions 20b are uneven, a contact pressure between each heat dissipation portion 20b and the thermal conductive sheet 23 varies, or some of the heat dissipation portions 20b are in an insufficient contact state. As a result, a problem that heat dissipation performance varies according to the battery cell 10 is easily caused.

In the battery module 1 of the present embodiment, positioning as described in (1) to (3) below is performed:

(1) rough positioning of the heat transfer plate 20 relative to the spacer 12 upon attachment of the heat transfer plate 20 to the battery cell 10;

(2) rough positioning of the spacers positioned one above the other upon stacking of the battery cells 10; and (3) collective correction of the uneven positions of the spacers 12 and the heat transfer plates 20 in the stacked state of the multiple battery cells 10 by means of the tools.

(1. Rough Positioning of Heat Transfer Plate 20 Relative to Spacer 12)

Figure 9:
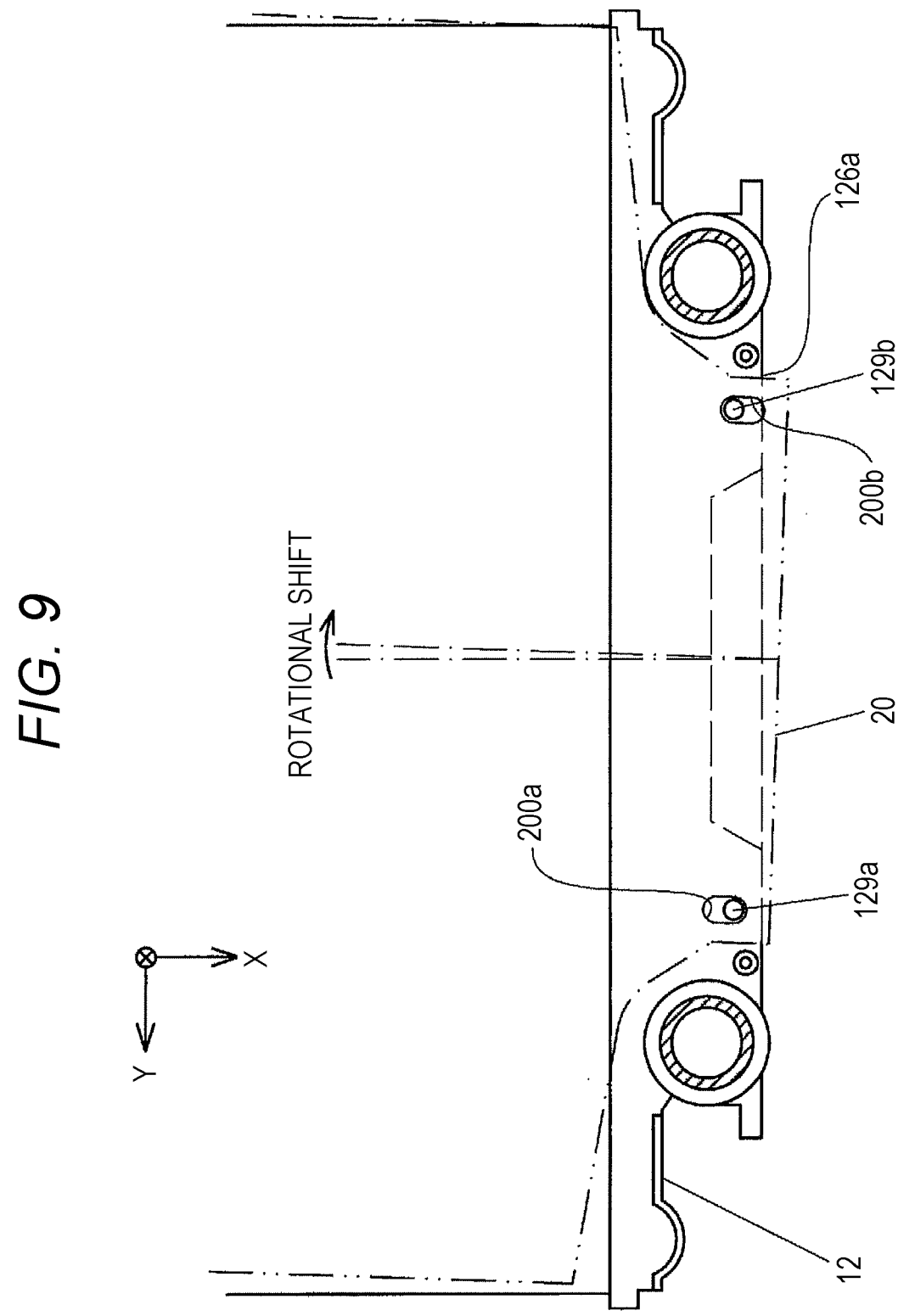
FIG. 9 shows a view for describing rough positioning of the heat transfer plates.

FIG. 9 is a view for describing rough positioning of the heat transfer plate 20 in (1) above. When the heat transfer plate 20 is attached to the bottom side of the battery cell 10, the columnar raised portions 129a, 129b formed on the bottom surface of the spacer 12 are inserted into the corresponding through-holes 200a, 200b of the heat transfer plate 20. In this manner, rough positioning of the heat transfer plate 20 relative to the spacer 12 and the battery cell 10 to which the spacer 12 is attached is performed.

As shown in FIGS. 8 and 9, the through-holes 200a, 200b are long holes elongated in the X-direction and having A as an X-direction dimension and B as a Y-direction dimension. A relationship among the dimensions A, B and the outer diameter D of the raised portion 129a, 129b is A>B>D, and it is set such that a clearance is formed between the raised portion 129a, 129b and the through-hole 200a, 200b. For example, A−D=about 1.6 mm and B−D=about 0.6 mm are set. With a positioning mechanism including the raised portions 129a, 129b and the through-holes 200a, 200b, the rotational shift of the heat transfer plate 20 as indicated by a chain double-dashed line in FIG. 9 can be suppressed small, and rough positioning of the heat transfer plate 20 can be easily performed. For suppressing the rotational shift of the heat transfer plate 20 as much as possible, at least two positioning locations are necessary, and are preferably on both sides of the heat transfer plate 20 in the Y-direction.

Reasons why the clearance is formed between the raised portion 129a, 129b and the through-hole 200a, 200b and positioning of the heat transfer plate 20 is not precise positioning but rough positioning are as follows. With the clearances, workability in assembly is improved. The spacer 12 is formed by resin molding, and the heat transfer plate 20 is formed in such a manner that a metal plate is bent in an L-shape. Thus, a machining error is easily caused in the spacer 12 and the heat transfer plate 20, and if a positioning accuracy is set high, it is difficult to assemble these components due to the machining error, leading to poor workability.

As described later, a process of aligning the positions of the heat dissipation portions 20b of the heat transfer plates 20 is performed after the battery cells 10 have been stacked on each other. At this point, the heat dissipation portions 20b are pressurized in the positive X-direction by the tool so as to contact the contact surfaces 260 of the heat transfer plate contact portions 126 of the spacers 12, and in this manner, the positions are aligned. Thus, the through-holes 200a, 200b are the long holes elongated in the X-direction such that the raised portions 129a, 129b do not contact the edges of the through-holes 200a, 200b before the heat dissipation portions 20b contact the heat transfer plate contact portions 126. Needless to say, the through-holes 200a, 200b may be circular through-hole. However, in a case where a clearance in the X-direction is the same as that in the case of the long hole, a clearance in the Y-direction is larger than that in the case of the long hole, and the rotational shift (see FIG. 9) of the heat transfer plate 20 is greater as compared to the case of the long hole. That is, the through-holes 200a, 200b are the long holes elongated in the X-direction so that the rotational shift can be suppressed smaller while the clearance in the X-direction is ensured.

(2. Rough Positioning of Upper and Lower Spacers)

Figure 10:
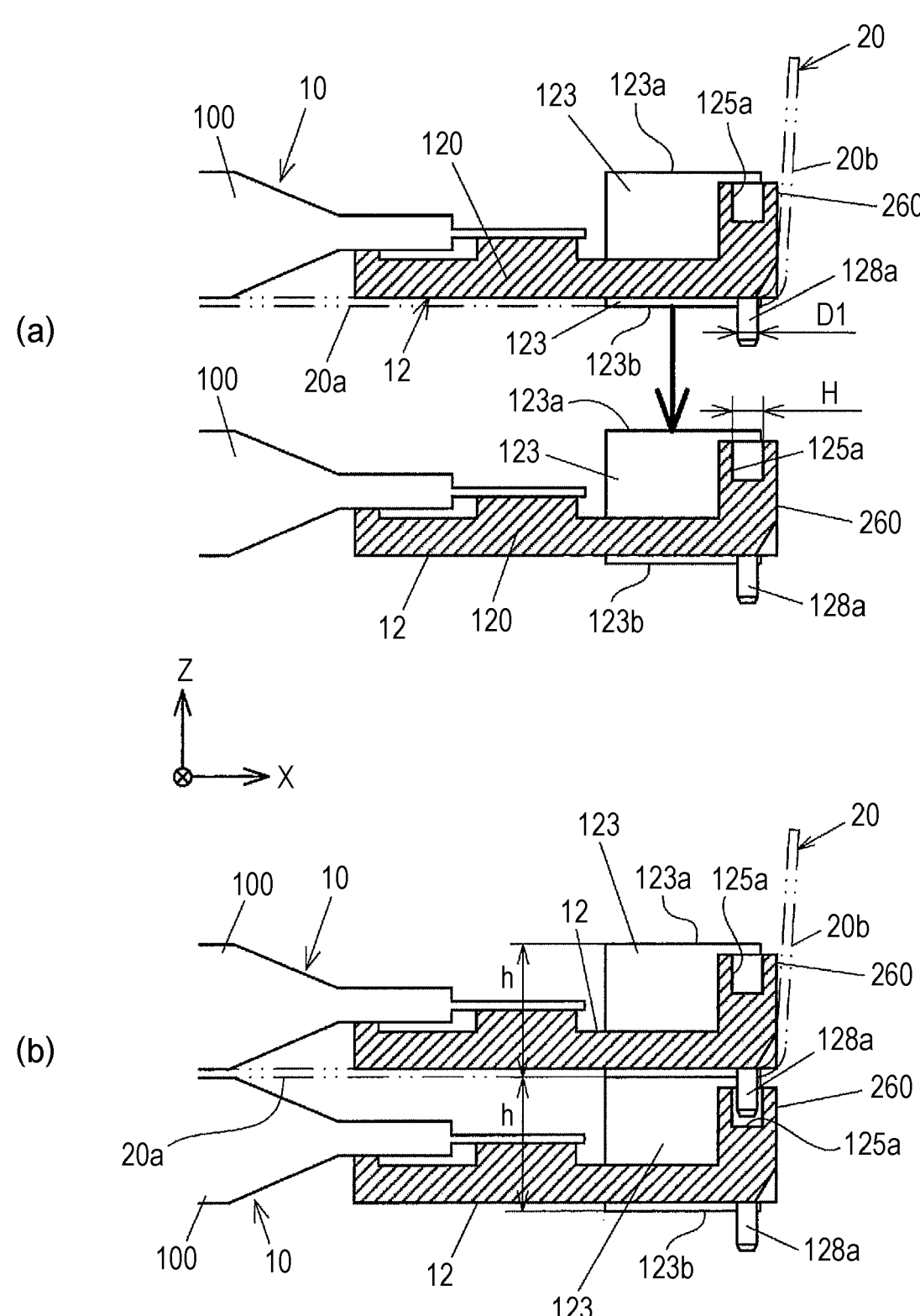
FIGS. 10(*a*) and 10(*b*) show views for describing rough positioning of the spacers upon stacking of the battery cells.

FIG. 10 shows views for describing rough positioning of the spacers 12 positioned one above the other in (2) above when the battery cells 10 are stacked on each other. FIG. 10 shows two upper and lower battery cells 10 along an E-E section of FIG. 4. FIG. 10(a) shows two battery cells 10 before stacking, and FIG. 10(b) shows the battery cells 10 after stacking. In any case, the heat transfer plate 20 (indicated by a chain double-dashed line) is attached to the upper battery cell 10.

The raised portion 128a formed on the bottom side of the spacer 12 is a columnar raised portion, for example. On the other hand, the recessed portion 125a formed on the top side of the spacer 12 is a rectangular recessed portion. The diameter D1 of the raised portion 128a and the length H of one side of the recessed portion 125a is set to a relationship of H>D1, and for example, H−D1=about 0.6 mm is set. As in FIG. 10(a), when the upper battery cell 10 is stacked on the lower battery cell 10, top surfaces 123a of the stack portions 123 of the lower spacer 12 contact bottom surfaces 123b of the stack portions 123 of the upper spacer 12, and a tip end portion of the raised portion 128a is inserted into the recessed portion 125a. Since H>D1 is set, a clearance is formed between a side surface of the raised portion 128a and a side surface of the recessed portion 125a as shown in FIG. 10(b). Thus, even in a case the upper and lower spacers 12 are, upon stacking, shifted from each other in the X-direction and the Y-direction within the area of the clearance, the raised portion 128a can be fitted in the recessed portion 125a, and rough positioning can be performed within the area of the clearance.

Regarding positioning of the battery cells 10, such a rough positioning mechanism is used as a positioning mechanism for the spacers 12 attached to the battery cells 10, and therefore, the workability in assembly can be improved. Further, the clearance is formed between the raised portion 128a and the recessed portion 125a in the X-direction and the Y-direction. Thus, the positions of the spacers 12 in the X-direction are aligned using the tools as described later so that the positions can be adjusted within the area of the clearance upon alignment of the X-direction positions of the battery cells 10. For example, even if a distance from the center of the raised portion 128a to the contact surface 260 of the heat transfer plate contact portion 126 (see FIG. 5) varies, such variation is absorbed by the clearance in the X-direction, and therefore, the X-direction positions of the spacers 12 integrated with the cell bodies 100 of the battery cells 10, i.e., the X-direction positions of the contact surfaces 260, can be aligned.

Further, in the present embodiment, the thickness dimension of one battery cell layer of the battery module 1 in the stack direction is defined by the height h of the stack portion 123 formed at the spacer 12, i.e., an interval h between the top surface 123a and the bottom surface 123b. The top surface 123a protrudes upward of an upper end of the heat transfer plate contact portion 126. Moreover, the bottom surface 123b protrudes downward of a lower end of the heat transfer plate contact portion 126 contacting the heat absorption portion 20a. The heat transfer plate 20 is arranged in a clearance between the heat transfer plate contact portions 126 positioned one above the other, and the heat dissipation portion 20b is exposed to the outside through such a clearance. Thus, the height dimension of the stack of the multiple battery cells 10 and the multiple heat transfer plates 20, i.e., the height dimension of the battery module 1, is constant regardless of the thickness of the heat transfer plate 20 and the number of heat transfer plates 20, and therefore, can be suppressed small.

Since the height dimension of the battery module 1 is constant regardless of the number of heat transfer plates 20, a component depending on the height of the battery module 1 can be shared even in a case where the number of heat transfer plates 20 is changed or the heat transfer plate 20 is not used according to intended use. The component depending on the height includes, for example, the side wall plates 13, the bus bar module 15, the terminal 17, and the resin cover 18 as shown in FIG. 2.

Note that the front spacer 11 also has a configuration for rough positioning of the spacers 11 positioned one above the other. As shown in FIGS. 5 and 6, the columnar raised portions 115a, 115b are formed on the bottom side of the spacer 11. the rectangular recessed portions 114a, 114b are formed on the top side of the spacer 11. Thus, when the spacers 11 are stacked one above the other, the raised portions 15a, 115b of the upper spacer 11 are each fitted in the recessed portions 114a, 114b of the lower spacer 11. In this case, the length of one side of the rectangular section of the recessed portion 114a, 114b is also set greater than the diameter of the raised portion 115a, 15b. Rough positioning of the spacers 11 is performed using the side surfaces of the raised portions 115a, 15b and the recessed portions 114a, 114b.

(3. Collective Correction of Uneven Positions of Spacers 12 and Heat Transfer Plates 20)

Figure 11:
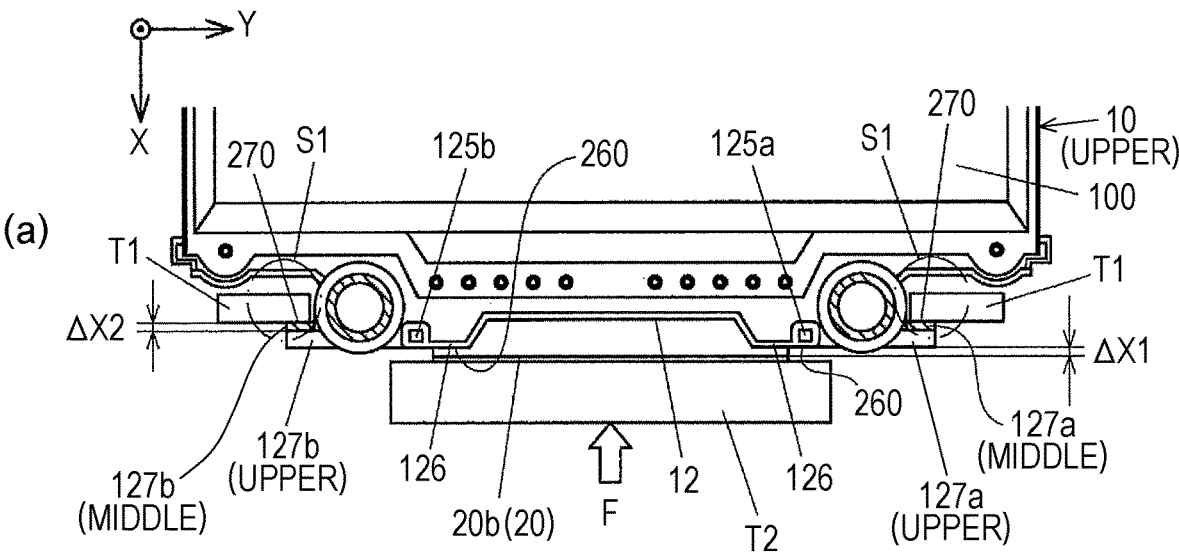
FIGS. 11(*a*) and 11(*b*) show views for describing a method for collectively correcting the uneven positions of the spacers and the heat transfer plates in a state in which the multiple battery cells are stacked on each other FIGS. 12 (*a*) and 12 (*b*) show views of a step subsequent to the step shown in FIGS. 11(*a*) and 11(*b*).
Figure 11:
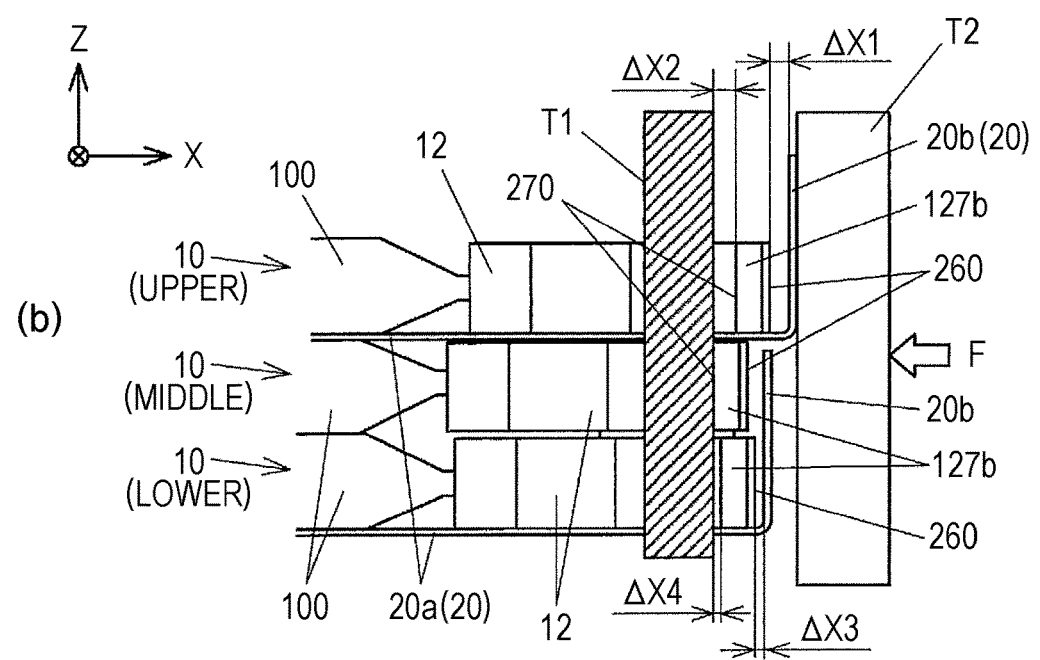
Figure 12:
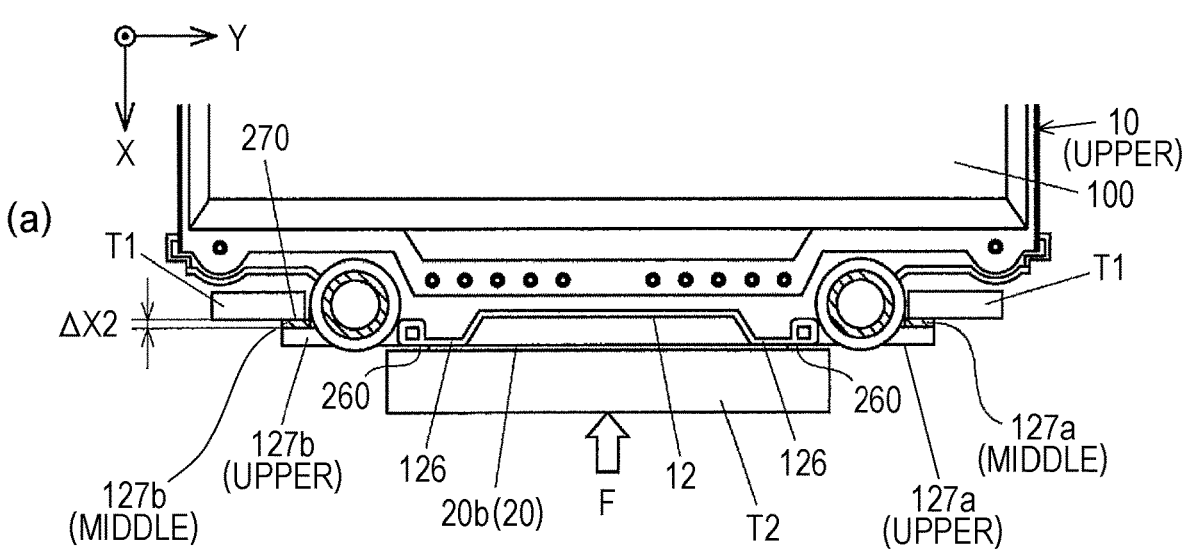
Figure 12:
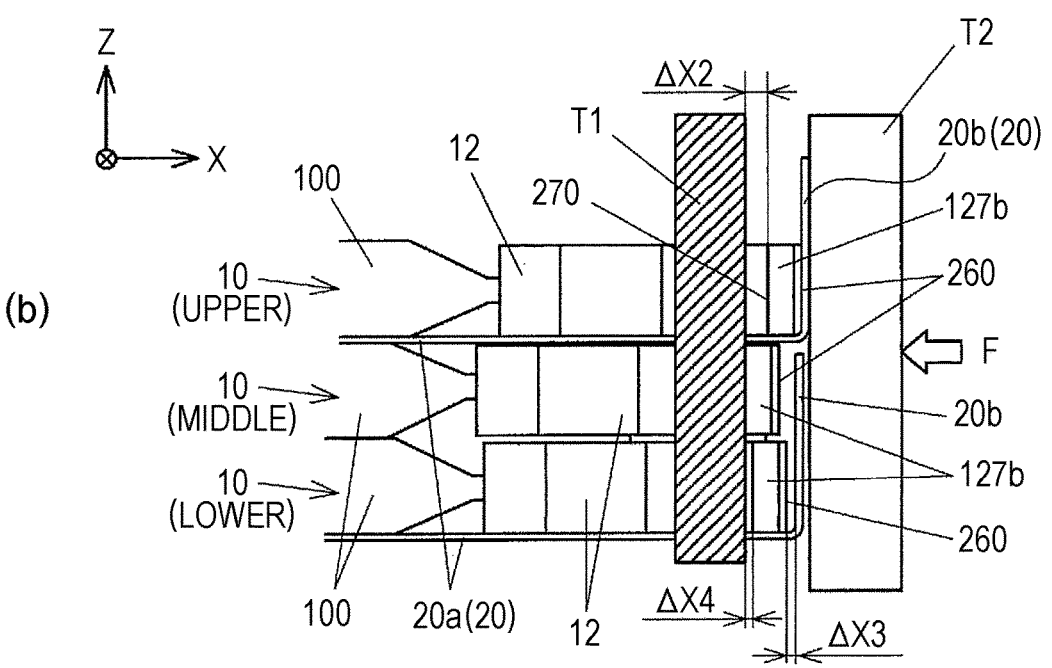
Figure 13:
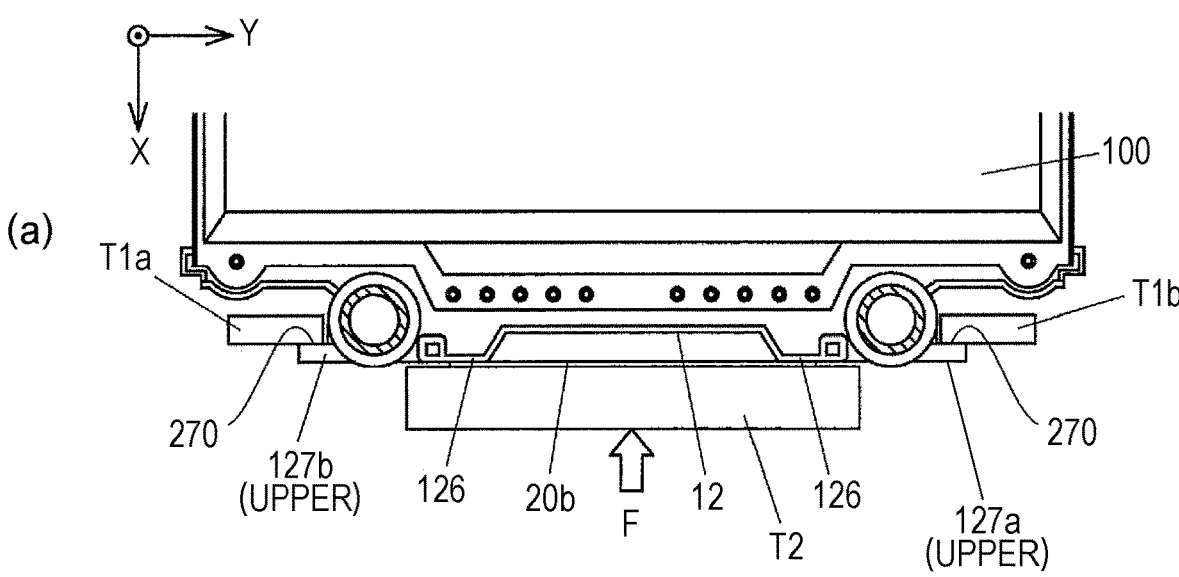
FIGS. 13(*a*) and 13(*b*) show views of a step subsequent to the step shown in FIGS. 12(*a*) and 12(*b*).
Figure 13:
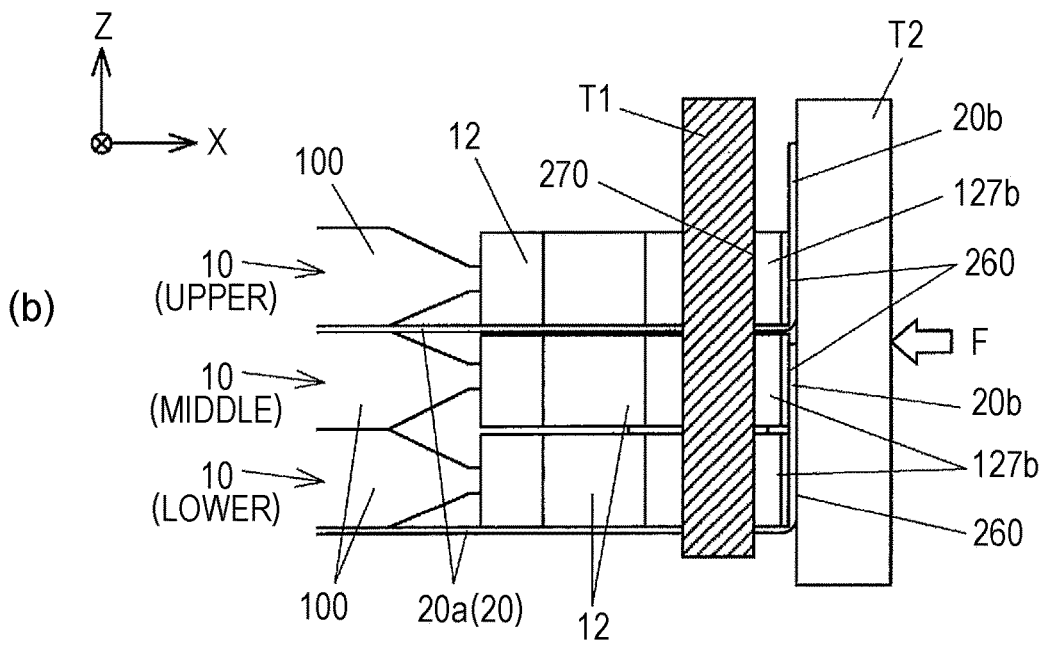

FIGS. 11 to 13 show views for describing a method for collectively correcting the uneven positions of the spacers 12 and the heat transfer plates 20 in a state in which the multiple battery cells 10 are stacked on each other. Note that an example shown in FIGS. 11 to 13 shows three battery cells 10 stacked on each other. As described above, the battery cells 10 stacked one above the other are bonded to each other with the adhesive, and the battery cell 10 and the heat absorption portion 20a of the heat transfer plate 20 are bonded to each other with the adhesive. Collective correction of the uneven positions is performed in a state in which the adhesive is not cured. Hereinafter, three battery cells 10 will be referred to as upper, middle, and lower from the top of the stack. In any of FIGS. 11 to 13, (a) is a view from the positive Z-direction, and (b) is a view from the negative Y-direction.

FIG. 11 shows views of a positional state before correction of the uneven positions. As shown in FIG. 11(b), the heat transfer plates 20 are provided on the bottom of the upper battery cell 10 and the bottom of the lower battery cell 10. Note that not only in FIG. 11(a) but also in FIGS. 11(a), 12(a) and 13(a) showing the views from the positive Z-direction, the lower battery cell 10 and the lower heat transfer plate 20 are not visible because these battery cell 10 and heat transfer plate 20 are hidden behind the upper and middle battery cells 10. For the spacer 12 attached to the middle battery cell 10, only the protrusions 127a, 127b provided at the spacer 12 are shown.

As shown in FIG. 11(b), the upper battery cell 10 is position-shifted from the middle battery cell 10 by a shift amount ΔX2 in the positive X-direction, and the lower battery cell 10 is position-shifted from the middle battery cell 10 by a shift amount ΔX4 in the positive X-direction. The upper heat transfer plate 20 is position-shifted from the spacer 12 attached to the upper battery cell 10 by a shift amount ΔX1 in the positive X-direction. A clearance equal to the shift amount ΔX1 is formed between each contact surface 260 of the spacer 12 and the heat dissipation portion 20*b* of the heat transfer plate 20. The lower heat transfer plate 20 is position-shifted from the spacer 12 attached to the lower battery cell 10 by a shift amount ΔX3 in the positive X-direction. A clearance equal to the shift amount ΔX3 is formed between each contact surface 260 of the spacer 12 and the heat dissipation portion 20*b* of the heat transfer plate 20.

Note that in the stacked state, the raised portions 128*a*, 128*b* (see FIG. 6) formed on the bottom surface of the upper spacer 12 are inserted into the recessed portions 125*a*, 125*b* formed at the top surface of the middle spacer 12. Thus, the shift amount ΔX2 is limited to a size acceptable by the clearance between the raised portion 128*a*, 128*b* and the recessed portion 125*a*, 125*b*. The same also applies to a relationship between the middle spacer 12 and the lower spacer 12, and the same limitation as that on the shift amount ΔX2 is on the shift amount ΔX4. The shift amount ΔX1, ΔX3 of the heat dissipation portion 20*b* relative to the spacer 12 is also limited to a size acceptable by a clearance between the raised portion 129*a*, 129*b* formed on the bottom surface of the spacer 12 and the through-hole 200*a*, 200*b* of the heat transfer plate 20 into which the raised portion 129*a*, 129*b* is inserted.

In the present embodiment, a step of collectively correcting, in the stacked state, the uneven positions of the battery cells 10 to which the spacers 12 are attached and the heat transfer plates 20 is performed before a process of welding the side wall plates 13 shown in FIG. 2 to the side surfaces of the pressure plates 14*a*, 14*b*. That is, this step is performed when the adhesive bonding the cell bodies 100 and bonding the cell body 100 and the heat absorption portion 20*a* is not cured before the stack of the multiple battery cells 10 and the multiple heat transfer plates 20 is pressurized by the top and bottom pressure plates 14*a*, 14*b*. Collective correction of the uneven positions is performed using positioning tools T1 and a pressing tool T2.

First, the positioning tools T1 are, as shown in FIGS. 11(*a*) and 11(*b*), arranged in the front (the side in the negative X-direction) spaces S1 of the protrusions 127*a*, 127*b* of each spacer 12. The positioning tool T1 is arranged so as to extend in the stack direction (the Z-direction), and is arranged so as to penetrate the spaces S1 of all spacers 12 stacked. In FIGS. 11(*a*) and 11(*b*), the positioning tool T1 is arranged in close contact with the front surface 270 of the protrusion 127*a*, 127*b* of the middle spacer 12, but may be arranged with a clearance.

Subsequently, the pressing tool T2 is pressed against the rear (the side in the positive X-direction) contact surfaces 260 of the upper heat dissipation portion 20*b*, and is biased in the negative X-direction. At this stage, the adhesive applied to between the heat transfer plate 20 and the cell body 100 stacked on each other and between the cell bodies 100 is in an uncured state. Thus, the pressing tool T2 is biased in the negative X-direction, and in this manner, the heat transfer plate 20 can be moved in the negative X-direction. In a case where the upper heat transfer plate 20 has been moved by the pressing tool T2, the battery cells 10 on the upper and lower sides of such a heat transfer plate 20 might also be, due to adhesive force of the adhesive, moved in the negative X-direction so as to be dragged by the heat transfer plate 20. In the case of arrangement of FIG. 11(*b*), the middle battery cell 10 cannot be moved because the protrusions 127*a*, 127*b* of the spacer 12 contact the positioning tools T1, but the upper battery cell 10 might be moved. For the sake of simplicity in description, a case where only the upper heat transfer plate 20 is moved by biasing force F of the pressing tool T2 will be described as an example.

When the upper heat transfer plate 20 is moved in the negative X-direction by the biasing force of the pressing tool T2, the shift amount ΔX1 decreases according to a movement amount. Then, as shown in FIGS. 12(*a*) and 12(*b*), the shift amount ΔX1 reaches zero when the heat dissipation portion 20*b* contacts the contact surfaces 260 of the upper spacer 12. When the biasing force F is further continuously applied even after the heat dissipation portion 20*b* of the upper heat transfer plate 20 has contacted the contact surfaces 260, the upper heat transfer plate 20 and the upper battery cell 10 integrally move in the negative X-direction, and the pressing tool T2 contacts the heat dissipation portion 20*b* of the lower heat transfer plate 20. When the biasing force F is further continuously applied, the upper heat transfer plate 20, the upper battery cell 10, and the lower heat transfer plate 20 integrally move in the negative X-direction. The shift amount ΔX3 reaches zero when the heat dissipation portion 20*b* of the lower heat transfer plate 20 contacts the contact surfaces 260 of the lower spacer 12.

Then, when the biasing force F is further continuously applied, the upper heat transfer plate 20, the upper battery cell 10, the lower heat transfer plate 20, and the lower battery cell 10 integrally move in the negative X-direction, and the surfaces 270 of the protrusions 127*a*, 127*b* of the upper and lower spacers 12 contact the tools T1. As a result, arrangement of the upper, middle, and lower battery cells 10 and the upper and lower heat transfer plates 20 becomes arrangement as shown in FIGS. 13(*a*) and 13(*b*).

As described above, the surfaces 270 of the protrusions 127*a*, 127*b* contact the positioning tools T1, and accordingly, the X-direction positions of the spacers 12 attached to the upper, middle, and lower battery cells 10 are aligned with a favorable accuracy. The upper and lower heat transfer plates 20 are positioned such that the heat dissipation portions 20*b* contact the heat transfer plate contact portions 126 of the spacers 12, and therefore, the X-direction positions of the heat dissipation portions 20*b* are aligned with a favorable accuracy.

Three upper, middle, and lower battery cells 10 have been described as an example with reference to FIGS. 11 to 13, but correction of the uneven positions of the spacers 12 and the heat transfer plates 20 by means of the tools T1, T2 is collectively performed for all of the multiple spacers 12 and the multiple heat transfer plates 20 stacked on each other. As a result, the heat dissipation portions 20*b* of all of the heat transfer plates 20 are positioned so as to contact the heat transfer plate contact portions 126 of the spacers 12 position-aligned in the X-direction, and the X-direction positions of the heat dissipation portions 20*b* are reliably aligned with a favorable accuracy. Thus, variation in the contact pressure between each heat dissipation portion 20*b* and the thermal conductive sheet 23 and the insufficient contact state of some of the heat dissipation portions 20*b* can be prevented, and a performance of dissipating heat from the heat dissipation portion 20*b* to the cooling plate 21 can be improved.

On the other hand, in a battery module described in Patent Literature 1, a second portion of a heat transfer plate is positioned so as to contact a side wall of a cell holder before the cell holders are stacked on each other. Thereafter, the multiple cell holders provided with the heat transfer plates are stacked on each other. For this reason, there is a probability that the positions of the cell holders are shifted from each other when the multiple cell holders are stacked on each other, and the positions of the second portions of the multiple heat transfer plates easily become uneven relative to an opposing thermal conductive member.

Note that in the case of employing the configuration in which the heat dissipation portion 20*b* contacts the heat transfer plate contact portions 126 of the spacer 12, the entire region of the heat dissipation portion 20*b* in the Y-direction does not necessarily contact the spacer 12. The example shown in FIGS. 11 to 13 has a structure in which both end regions of the heat dissipation portion 20*b* in the Y-direction contact the spacer 12 (see, e.g., FIG. 11(*a*)). The spacer 12 has such a shape that the heat transfer plate contact portions 126 protrude toward the heat dissipation portion 20*b*. With this shape, the spacer resin material can be reduced, and the mass and cost of the spacer 12 can be reduced.

Figure 14:
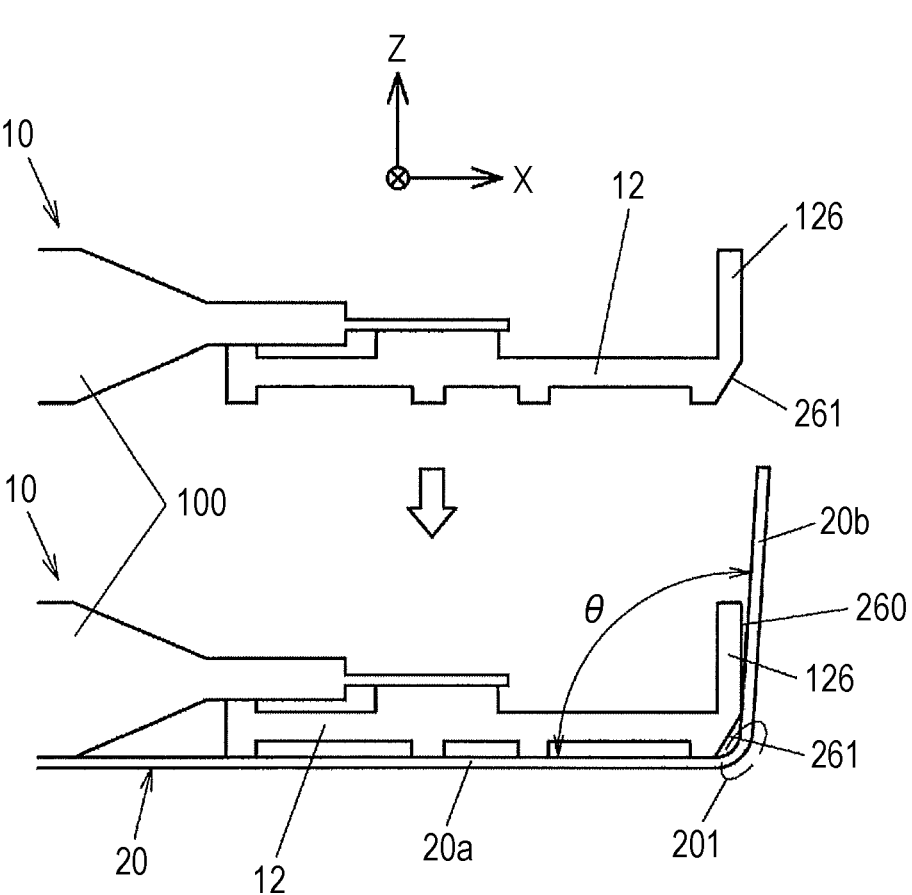
FIG. 14 shows a view for describing, e.g., the bending angle of the heat transfer plate.

FIG. 14 is a view for describing, e.g., the bending angle of the heat transfer plate 20. The heat dissipation portion 20*b* of the heat transfer plate 20 is, for ensuring a sufficient heat dissipation area, set such that an upper end of the heat dissipation portion 20*b* protrudes in the positive Z-direction with respect to an upper end of the spacer 12. Thus, an angle θ between the heat absorption portion 20*a* and the heat dissipation portion 20*b* is set to 90 deg+α (α is small to such an extent that a is greater than 1 deg and smaller than 10 deg) such that degradation of the workability due to contact between the spacer 12 on the upper side and the upper end of the heat dissipation portion 20*b* in a process of stacking the battery cells 10 on each other is avoided. With this configuration, contact between the spacer 12 and the heat dissipation portion 20*b* in the process of stacking the battery cells 10 on each other can be reduced, and productivity can be improved. Needless to say, although there is a disadvantage that the workability in assembly is poorer, θ=90 deg may be set.

A tapered surface 261 may be formed at the lower end of the heat transfer plate contact portion 126, i.e., a position facing a connection region 201 between the heat absorption portion 20*a* and the heat dissipation portion 20*b*. In a case where the upper end of the heat dissipation portion 20*b* contacts the tapered surfaces 261 of the spacer 12 on the upper side upon stacking, the heat dissipation portion 20*b* is deformed in a direction of increasing the angle, and a force of guiding the spacer 12 in the negative X-direction acts on the spacer 12. Degradation of the workability due to contact between a tip end of the heat dissipation portion 20*b* and the spacer 12 can be reduced. Note that both of the configuration in which the angle θ is set to 90 deg+α and the configuration in which the spacer 12 is formed with the tapered surfaces 261 may be employed or only any one of these configurations may be employed.

As in FIG. 14, in a case where the angle θ of the heat dissipation portion 20*b* is set to 90 deg+α, when the pressing tool T2 is detached from the state of FIGS. 13(*a*) and 13(*b*), the heat dissipation portion 20*b* returns to a state of θ=90 deg+α from a state (θ=90 deg) of contacting the contact surfaces 260 of the spacer 12. However, even in this case, at least part (e.g., lower end portions of the contact surfaces 260) of the heat transfer plate contact portions 126 contacts the heat dissipation portion 20*b*, and positioning of the heat dissipation portion 20*b* relative to the spacer 12 is performed by the heat transfer plate contact portions 126.

Figure 15:
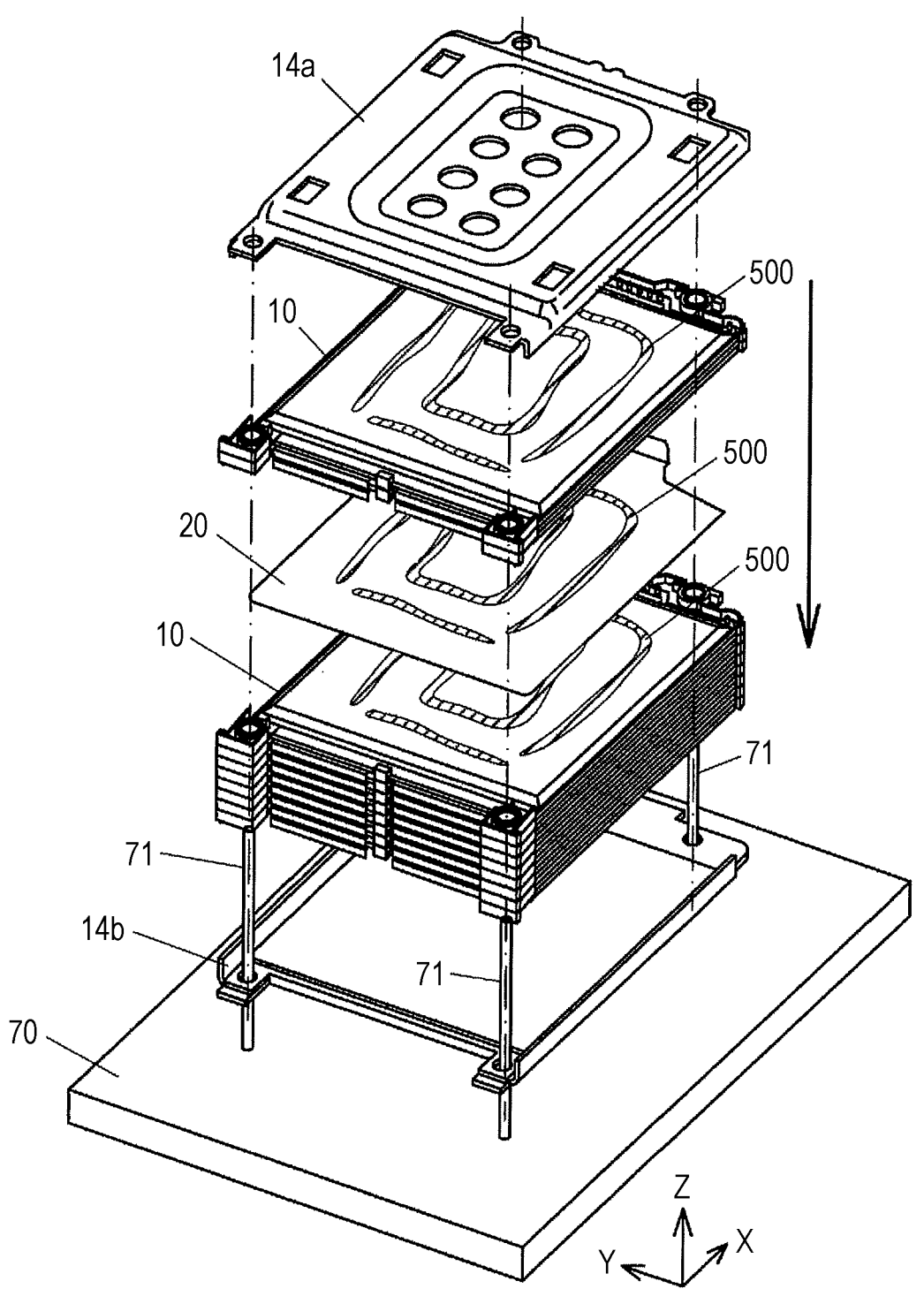
FIG. 15 shows a view of a first step of steps of manufacturing the battery module.

Next, a method (steps) for manufacturing the battery module 1 will be described with reference to FIGS. 15 to 17. The steps of manufacturing the battery module 1 generally include a first step of stacking stack members forming the battery module 1, a step of aligning the positions of the heat dissipation portions 20*b* of the heat transfer plates 20, a step of welding the side wall plates 13 while compressing the structure including the stack of the stack members, a step of welding bus bars 150 (150A, 150B), and a step of attaching the bus bar module 15, the terminal 17, the resin cover 18 and the like. In the stacking step, a mounting table 70 as shown in FIG. 15 is used. The mounting table 70 is provided with four locator pins 71. Upon stacking, the locator pins 71 are inserted into the through-holes 113*a*, 124*a* of the spacers 11, 12 and the through-holes 140 of the pressure plates 14*a*, 14*b*.

In the first step shown in FIG. 15, ten battery cells 10, four heat transfer plates 20, and the pressure plates 14*a*, 14*b* are stacked on each other. The spacers 11, 12 are attached to each battery cell 10. Specifically, as shown in FIG. 3, the pressure plate 14*b*, the first battery cell 10, the second battery cell 10, the third battery cell 10 provided with the heat transfer plate 20, the fourth battery cell 10, the fifth battery cell 10 provided with the heat transfer plate 20, the sixth battery cell 10, the seventh battery cell 10 provided with the heat transfer plate 20, the eighth battery cell 10, the ninth battery cell 10 provided with the heat transfer plate 20, the tenth battery cell 10, and the pressure plate 14*b* are stacked in this order from the bottom. The heat transfer plate 20 is attached to the bottom surface of the cell body 100 of the battery cell 10 with an adhesive 500.

When the battery cells 10 are stacked on each other, the adhesive 500 is applied to a surface of one of the cell bodies 100 to be bonded to each other and a surface of one of the cell body 100 or the heat transfer plate 20 to be bonded to each other. The adhesive 500 is, for example, two-component reactive acrylic anaerobic resin, and after applied, is cured after a lapse of a predetermined time. The later-described second step is performed before the adhesive 500 is cured (before a lapse of the predetermined time). An adhesive having viscoelasticity even after cured and maintained in a gel state is preferably used as the adhesive 500, and can generate reactive force to the cell upon expansion of the cell body 100. In the later-described third step, the structure including the stack is pressurized in the stack direction. Accordingly, the adhesive 500 expands across a wide area between the battery cells 10 and between the battery cell 10 and the heat transfer plate 20, and therefore, a bonding area expands. As described above, the battery cells 10 thermally contact each other through the adhesive 500, and the battery cell 10 and the heat transfer plate 20 thermally contact each other through the adhesive 500. Thus, heat of the cell body 100 is transmitted to the heat transfer plate 20 through the adhesive 500.

Figure 16:
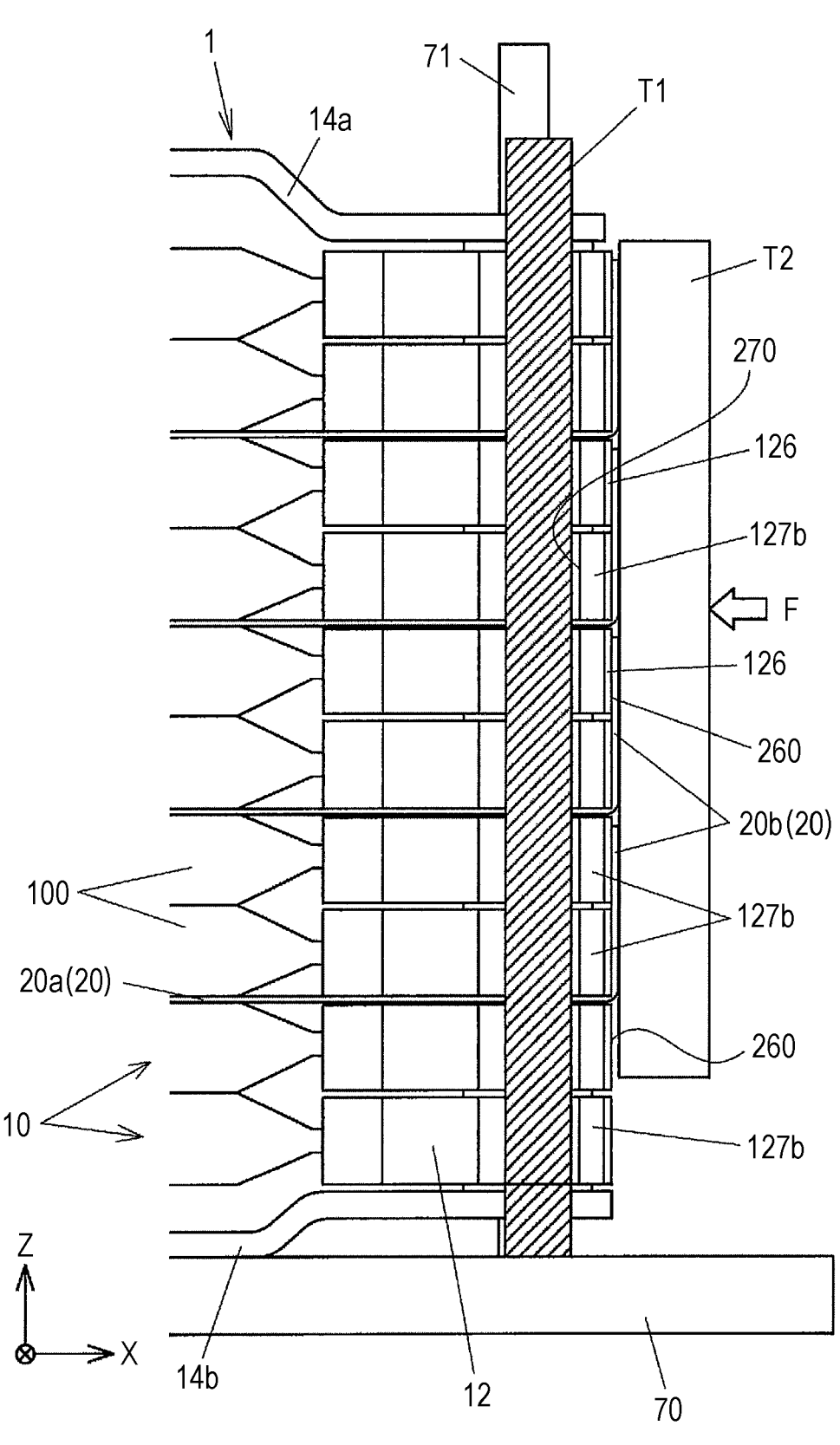
FIG. 16 shows a view of a second step of the steps of manufacturing the battery module.

In the second step shown in FIG. 16, in the stacked state before the adhesive 500 is cured, the positions of the heat dissipation portions 20*b* of the multiple heat transfer plates 20 and the positions of the spacers 12 of the multiple battery cells 10 are aligned to each other. Hereinafter, description will be made also with reference to FIGS. 11 to 13. First, the positioning tool T1 is arranged at the back (the left side as shown in the figure) of the protrusion 127*b* formed at each spacer 12 so as to face the surface 270 of each protrusion 127*b*. Similarly, another positioning tool T1 is arranged at the back (the left side as viewed in the figure) of each protrusion 127*a* on the opposite side in the Y-direction so as to face the surface 270 of each protrusion 127*a*. As described above, the pair of positioning tools T1 is arranged at the back of the protrusions 127*a*, 127*b* (see FIG. 11).

Subsequently, the pressing tool T2 is pressed against the heat dissipation portion 20*b* of each heat transfer plate 20, and is biased in the negative X-direction with the force F. By such biasing force F, the position-shifted battery cells 10 and heat transfer plates 20 are moved in the negative X-direction, and eventually, the protrusions 127*a*, 127*b* of the spacer 12 of each battery cell 10 contact the positioning tool T1, as shown in FIGS. 11 and 12. As a result, the X-direction positions of the heat transfer plate contact portions 126 contacting the heat dissipation portions 20*b* are aligned, and the X-direction positions of the heat dissipation portions 20*b* are aligned. As described above, by pressing by the pressing tool T2 in the stacked state, position alignment of the spacers 12 (i.e., the battery cells 10) and position alignment of the heat dissipation portions 20*b* can be collectively performed. Needless to say, in a case where unevenness in the X-direction positions of the spacers 12 is small, the positions of the heat dissipation portions 20*b* can be aligned without the need for biasing the positioning tools T1 until the protrusions 127*a*, 127*b* contact the positioning tools T1 as described above.

Figure 17:
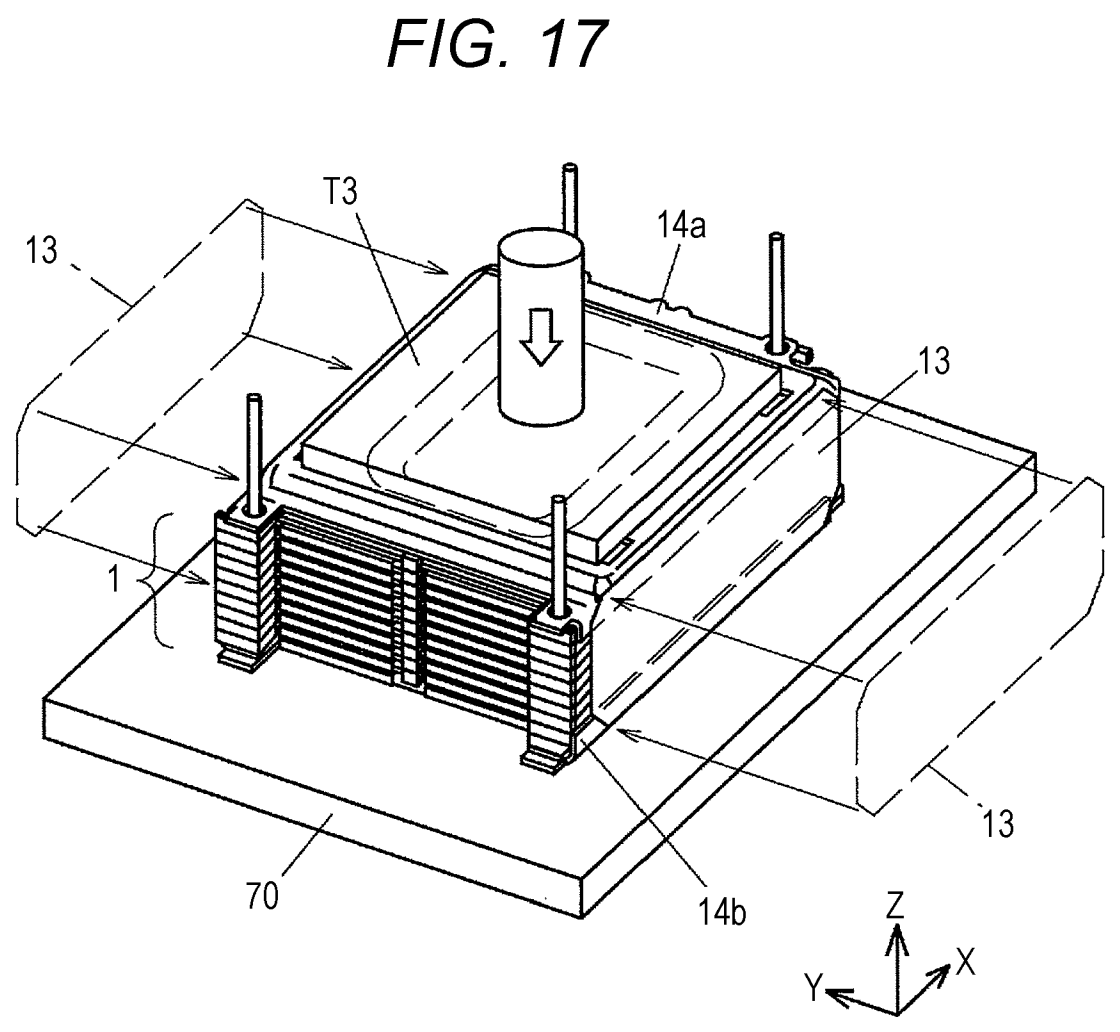

In the third step shown in FIG. 17, the structure including the stack is pressurized in the stack direction, and the side wall plates 13 are welded to the side surfaces of the pressure plates 14*a*, 14*b*. By pressurization, the uncured adhesive 500 applied to between the battery cells 10 and between the battery cell 10 and the heat transfer plate 20 expands across a wider area. As shown in FIG. 16, when a top surface of the pressure plate 14*a* is pressurized in the negative Z-direction by a pressurization tool T3, top surfaces of the stack portions 112 (see FIG. 5) of the front spacer 11 and a bottom surface of the spacer 11 positioned thereabove closely contact each other. In addition, top surfaces of the stack portions 123 (see FIG. 5) of the rear spacer 12 and a bottom surface of the spacer 12 positioned thereabove closely contact each other. Then, in a pressurized state, the side wall plates 13 are joined to both side surfaces of the pressure plates 14*a*, 14*b* in the Y-direction by, e.g., laser welding.

Figure 18:
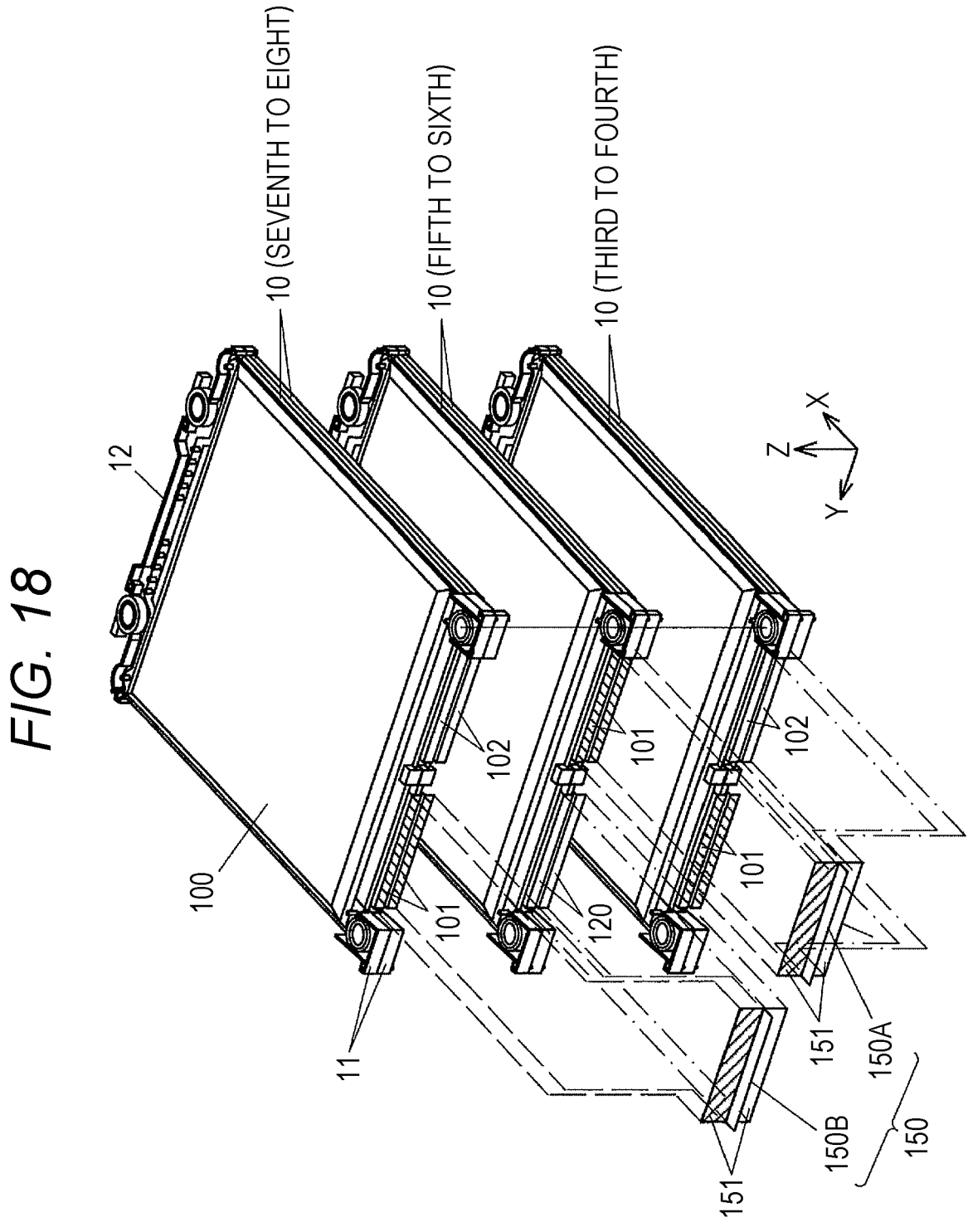
FIG. 18 shows a view of a fourth step of the steps of manufacturing the battery module.

In the fourth step shown in FIG. 18, the bus bars 150 (150A, 150B) are welded to the positive electrode tabs 101 and the negative electrode tabs 102 of the battery cells 10 stacked on each other, thereby connecting corresponding ones of the battery cells 10 to each other. FIG. 18 shows one example of a connection form using the bus bars, and shows a connection example of a case where ten battery cells are connected in a two-parallel five-series form. FIG. 18 shows the third to eighth battery cells 10. The third and fourth battery cells 10 are connected in parallel, the fifth and sixth battery cells 10 are connected in parallel, and the seventh and eighth battery cells 10 are connected in parallel. The pair of third and fourth battery cells 10 connected in parallel and the pair of fifth and sixth battery cells 10 connected in parallel are connected in series, and the pair of fifth and sixth battery cells 10 and the pair of seventh and eighth battery cells 10 are connected in series.

In FIG. 18, the positive electrode tabs 101 of the battery cells 10 are hatched. Of the third and fourth battery cells 10 and the seventh and eighth battery cells 10, the positive electrode tabs 101 are provided on the left side as viewed in the figure, and the negative electrode tabs 102 are provided on the right side as viewed in the figure. Of the fifth and sixth battery cells 10, the positive electrode tabs 101 are, on the other hand, provided on the right side as viewed in the figure, and the negative electrode tabs 102 are provided on the left side as viewed in the figure. In FIG. 18, the bus bars connecting the fifth and sixth battery cells 10 to each other and connecting the third and fourth battery cells 10 to each other are indicated by a reference numeral 150A, and the bus bars connecting the fifth and sixth battery cells 10 to each other and connecting the seventh and eighth battery cells 10 to each other are indicated by a reference numeral 150B. The bus bar 150A, 150B includes a pair of connection portions 151 to be connected to the positive electrode tabs 101 and the negative electrode tabs 102 of the battery cells 10. In FIG. 18, the connection portion 151 connected to the positive electrode tabs 101 is hatched.

Of the pair of connection portions 151 of the bus bar 150A, one connection portion 151 hatched is connected to the positive electrode tabs 101 of the fifth and sixth battery cells 10. The other connection portion 151 is connected to the negative electrode tabs 102 of the third and fourth battery cells 10 arranged below the fifth and sixth battery cells 10. Of the pair of connection portions 151 of the bus bar 150B, one connection portion 151 hatched is connected to the positive electrode tabs 101 of the seventh and eighth battery cells 10. The other connection portion 151 is connected to the negative electrode tabs 102 of the fifth and sixth battery cells 10. As a result, the third and fourth battery cells 10 are connected in parallel, the fifth and sixth battery cells 10 are connected in parallel, and the seventh and eighth battery cells 10 are connected in parallel. The pair of third and fourth battery cells 10 connected in parallel, the pair of fifth and sixth battery cells 10 connected in parallel, and the pair of seventh and eighth battery cells 10 connected in parallel are connected in series in this order.

Note that FIG. 18 does not show the first and second battery cells 10 and the ninth and tenth battery cells 10. Of the first and second battery cells 10 and the ninth and tenth battery cells 10, the positive electrode tabs 101 are provided on the right side as viewed in the figure and the negative electrode tabs 102 are provided on the left side as viewed in the figure, as in the fifth and sixth battery cells 10. The negative electrode tabs 102 of the first and second battery cells 10 are connected to the positive electrode tabs 101 of the third and fourth battery cells 10 through the bus bar 150. The positive electrode tabs 101 of the ninth and tenth battery cells 10 are connected to the negative electrode tabs 102 of the seventh and eighth battery cells 10 through the bus bar 150. Further, although not shown in the figure, the bus bar is provided to connect the positive electrode tabs 101 of the first and second battery cells 10 to each other. In addition, the bus bar is provided to connect the negative electrode tabs 102 of the ninth and tenth battery cells 10 to each other. As a result, five pairs of battery cells 10 connected in parallel are connected in series.

Subsequently, in the fifth step, the bus bar module 15 is attached to the front side of the stack of the battery cells 10 connected to each other through the bus bars (not shown), as shown in FIG. 2. The terminal 17 is provided on the front side of the bus bar module 15. Further, the pair of terminal covers 19 is provided on the top surface of the terminal 17. The resin cover 18 is attached to the front side of the terminal 17. As a result, the battery module 1 shown in FIG. 1 is completed.

Note that in the steps of manufacturing the battery module 1 as described above, the mounting table 70 provided with the locator pins 71 is used as shown in FIG. 15. The locator pins 71 are provided for rough positioning when the battery cells 10 are stacked on each other. Note that rough positioning of the battery cells 10 upon stacking thereof on each other can be performed by the raised portions 128*a*, 128*b* and the recessed portions 125*a*, 125*b* shown in FIG. 10. Thus, the locator pins 71 may be omitted.

(Variations)

(a) The cell has been described as the flat laminated cell. However, the present invention is also applicable to a cubical rectangular cell. In this variation, the contact surfaces 260, the surfaces 270, and the heat transfer plate contact portions 126 are provided on one end side of a package member of the rectangular cell.

(b) The shape of the spacer 12 may be any shape as long as the spacer 12 includes the contact surfaces 260, the surfaces 270, and the heat transfer plate contact portions 126.

Features and advantageous effects of the embodiment described above will be described.

(1) The battery module of the embodiment includes the multiple battery cells 10 stacked on each other, the spacer 12 provided at the end portion of each battery cell 10, and the heat transfer plates 20 each of which has the heat absorption portion 20a arranged between the multiple battery cells 10 stacked on each other to absorb heat from the battery cells 10 and the heat dissipation portion 20b dissipating the heat absorbed by the heat absorption portion 20a to the outside. The heat dissipation portion 20b is bent relative to the heat absorption portion 20a, and is exposed through between the battery cells 10 to contact the spacer 12. The spacer 12 includes the heat transfer plate contact portions 126 having the contact surfaces 260 contacting the heat dissipation portion 20b and the protrusion 127a as a positioning portion having the surface 270 facing the direction opposite to that of the contact surface 260 and defining the position of the spacer 12.

According to the battery module of the embodiment, the spacer 12 is provided with the contact surfaces 260 facing the heat dissipation portion 20b and the positioning surfaces 270 facing the direction opposite to that of the contact surface 260. Thus, the positioning tool T1 contact each surface 270 of the spacers 12 for the battery cells 10 stacked on each other so that the positions of the battery cells 10 can be restricted. Moreover, in a state in which the positions of the battery cells 10 are restricted by the positioning tools T1, the pressing tool T2 contacts the outer surfaces of the standing walls of the heat dissipation portions 20b so that the heat transfer plates 20 can be pressed toward the positioning tools T1. As described above, the spacer 12 has two surfaces 260 and two surfaces 270 facing the opposite directions. Using these surfaces 260, 270, the positions of the heat transfer plates 20 relative to the spacers 12 can be aligned for all of the battery cells 10. In other words, positioning for aligning all of the heat dissipation portions 20b substantially on the same plane can be performed. Thus, the performance of dissipating heat from the heat dissipation portion 20b to the cooling plate 21 can be improved.

(2) In the battery module according to (1), the heat absorption portion 20a is formed with the through-holes (holes) 200a, 200b, and the spacer 12 includes the raised portions 129a, 129b protruding toward the heat absorption portion 20a and inserted into the through-holes (the holes) 200a, 200b with the clearance formed therebetween. For example, as shown in FIG. 8, the dimensions A, B, D are set as in A>B>D such that the clearance is formed between the raised portion 129a, 129b and the through-hole 200a, 200b, and therefore, the rotational shift of the heat transfer plate 20 as indicated by the chain double-dashed line in FIG. 9 can be reduced as much as possible while rough positioning of the heat transfer plate 20 relative to the cell body 100 of the battery cell 10 is easily performed.

(3) In the battery module according to (1) or (2), the heat absorption portion 20a is bonded to the battery cell 10 with the adhesive 500. After the adhesive has been cured, the heat absorption portion 20a closely contacts the cell body 100 without position shift. Thus, degradation of heat transmission performance between the heat absorption portion 20a and the cell body 100 can be reduced.

(4) In the battery module according to any one of (1) to (3), the tapered surface 261 is, at the spacer 12, formed at the position facing the connection region 201 between the heat absorption portion 20a and the heat dissipation portion 20b. As a result, even in a case where the tip end of the heat dissipation portion 20b contacts the tapered surface 261 upon stacking of the battery cells 10, deformation in the direction in which the angle θ of the heat dissipation portion 20b increases occurs, and degradation of workability in stacking can be prevented.

(5) In the battery module according to any one of (1) to (4), the angle θ (see FIG. 14) between the heat absorption portion 20a and the heat dissipation portion 20b is set greater than 90 degrees and smaller than 100 degrees. The angle θ is set as described above so that contact between the spacer 12 and the heat dissipation portion 20b upon stacking of the battery cells 10 can be reduced and the productivity can be improved.

(6) In the battery module according to any one of (1) to (5), the spacer 12 further includes the stacking portions 123 each of which is formed with the top surface (first end surface) 123a on the top side in the stack direction and the bottom surface (second end surface) 123b on the bottom side in the stack direction and configured such that the interval between the top surface 123a and the bottom surface 123b is set to the battery cell stacking interval h. Of the stacked spacer 12, the top surface 123a contacts the bottom surface 123b of the spacer 12 positioned thereabove, and the bottom surface 123b contacts the top surface 123a of the spacer 12 positioned therebelow. Thus, the height dimension of the stack of the multiple battery cells 10 and the multiple heat transfer plates 20, i.e., the height dimension of the battery module 1, is constant regardless of the thickness of the heat transfer plate 20 and the number of heat transfer plates 20, and the height dimension of the battery module 1 can be reduced.

(7) In the battery module according to (6), in a state in which the second end surface 123b of the spacer 12 positioned above and the first end surface 123a of the spacer 12 positioned below contact each other, the space where the heat transfer plate 20 is arranged is formed in the clearance between the spacers positioned one above the other. The heat transfer plate 20 can be exposed to the outside of the stack without contacting the stacking portions 123.

(8) The battery device of the embodiment includes the battery module 1 according to any one of (1) to (7), and the cooling plate 21 as a member pressed against the heat dissipation portions 20b of the multiple heat transfer plates 20 provided in the battery module 1 through the thermal conductive sheet 23 to absorb heat from the heat dissipation portions 20b. As a result, heat of the multiple heat transfer plates 20 is efficiently transmitted to the cooling plate 21, and the battery module 1 can be effectively cooled.

(9) The method for manufacturing the battery module according to the embodiment is the method for manufacturing the battery module including the multiple battery cells 10 stacked on each other, the multiple heat transfer plates 20 each of which is arranged between adjacent ones of the battery cells 10 stacked on each other, and the spacer 12 provided at the end portion of each battery cell 10, each heat transfer plate 20 having the heat absorption portion 20a arranged between adjacent ones of the battery cells 10 stacked on each other and the heat dissipation portion 20b exposed so as to bend to the outside of the battery cells 10 stacked on each other and facing the spacer 12. The method includes the first step of stacking the multiple battery cells 10 and the multiple heat transfer plates 20, and the second step of collectively pressing, after the first step, the multiple heat dissipation portions 20b toward the spacer 12 by the pressing tool T2, thereby causing each heat dissipation portion 20b to contact the opposing spacer 12 to align the positions of the multiple spacers 12 and align the positions of the multiple heat dissipation portions 20b.

In the second step, each of the multiple heat dissipation portion 20b contacts the opposing spacer 12 in such a manner that the multiple heat dissipation portions 20b are collectively pressed toward the spacer 12 by the pressing tool T2. Thus, the positions of the multiple spacers 12 contacting the heat dissipation portions 20b are aligned by pressing, and accordingly, the positions of the multiple heat dissipation portions 20b are also aligned. As a result, the surface pressure of each heat dissipation portion 20b on the thermal conductive sheet 23 can be uniform, and therefore, variation in the heat dissipation performance among the multiple battery cells 10 can be reduced, and the heat dissipation performance of the battery module 1 can be improved.

(10) In the method for manufacturing the battery module according to (9), the spacer 12 further includes the first contact surfaces 260 contacting the heat dissipation portion 20b and the second surfaces 270 facing the direction opposite to that of the first contact surfaces 260. In the second step, the positioning tools T1 are arranged so as to face the second surfaces 270 of the multiple spacers 12. The heat dissipation portions 20b are pressed toward the spacer 12 by the pressing tool T2 until each second surface 270 of the multiple spacers 12 contacts the positioning tool T1. As described above, the positions of the spacers 12 stacked on each other are aligned using the positioning tools T1 so that the positions of the heat dissipation portions 20b can be aligned with a higher accuracy.

(11) In the method for manufacturing the battery module according to (9) or (10), in the first step, the multiple battery cells 10 and the multiple heat transfer plates 20 are stacked on each other through the adhesive 500 cured after a lapse of the predetermined time, and the second step is performed before the adhesive 500 is cured. Thus, the positions of the multiple spacers 12 and the positions of the multiple heat dissipation portions 20b can be easily aligned. The adhesive 500 is cured after position alignment, and therefore, the positions of the multiple spacers 12 and the multiple heat dissipation portions 20b are held aligned.

Various embodiments and variations thereof have been described above. Note that the present invention is not limited to the contents of these embodiments and variations. Other aspects conceivable within the scope of the technical idea of the present invention are also included in the scope of the present invention.

LIST OF REFERENCE SIGNS

1 Battery Module
10 Battery Cell
11, 12 Spacer
13 Side Wall Plate
14a, 14b Pressure Plate
15 Bus Bar Module
150, 150A, 150B Bus Bar
17 Terminal
18 Resin Cover
19 Terminal Cover
20 Heat Transfer Plate
20a Heat Absorption Portion
20b Heat Dissipation Portion
21 Cooling Plate
23 Thermal Conductive Sheet
100 Cell Body
101 Positive Electrode Tab
102 Negative Electrode Tab
112, 123 Stack Portion
123a Top Surface
123b Bottom Surface
126 Heat Transfer Plate Contact Portion
125a, 125b Recessed Portion
127a, 127b Protrusion
128a, 128b, 129a, 129b Raised Portion
200a, 200b Through-Hole
201 Connection Region
270 Surface
260 Contact Surface
261 Tapered Surface
400 Battery Device
500 Adhesive
T1 Positioning Tool
T2 Pressing Tool
T3 Pressurization Tool

What is claimed is:

1. A battery module comprising:
multiple battery cells stacked on each other;
a spacer provided at an end portion of each battery cell; and
a heat transfer plate having a heat absorption portion arranged between the multiple battery cells stacked on each other to absorb heat from the battery cells and a heat dissipation portion dissipating the heat absorbed by the heat absorption portion to an outside,
wherein the heat dissipation portion is bent relative to the heat absorption portion, and is exposed through between the battery cells to contact the spacer,
the spacer includes
a contact portion having a contact surface contacting the heat dissipation portion, and
a positioning portion having a surface facing a direction opposite to that of the contact surface and defining a position of the spacer,
the heat absorption portion is formed with a hole, and
the spacer includes a raised portion protruding toward the heat absorption portion and inserted into the hole with a clearance formed therebetween.

2. The battery module according to claim 1, wherein the heat absorption portion is bonded to a corresponding one of the battery cells with an adhesive.

3. The battery module according to claim 1, wherein a tapered surface is, at the spacer, formed at a position facing a connection region between the heat absorption portion and the heat dissipation portion.

4. The battery module according to claim 1, wherein an angle between the heat absorption portion and the heat dissipation portion is set greater than 90 degrees and smaller than 100 degrees.

5. A battery device comprising:
the battery module according to claim 1; and
a cooling member pressed against heat dissipation portions of multiple heat transfer plates provided in the battery module through a thermal conductive sheet to absorb heat from the heat dissipation portions.

6. A method for manufacturing the battery module according to claim 1,
the method comprising:
a first step of stacking the multiple battery cells and the multiple heat transfer plates; and a second step of collectively pressing, after the first step, the multiple heat dissipation portions toward the spacer by a pressing tool, thereby causing each heat dissipation portion to contact the opposing spacer to align positions of the multiple spacers and align positions of the multiple heat dissipation portions.

7. The method for manufacturing the battery module according to claim 6, wherein the spacer further includes a first surface contacting the heat dissipation portion and a second surface facing a direction opposite to that of the first surface, in the second step, a positioning tool is arranged so as to face the second surfaces of the multiple spacers, and the heat dissipation portions are pressed toward the spacer by the pressing tool until each second surface of the multiple spacers contacts the positioning tool.

8. The method for manufacturing the battery module according to claim 6, wherein in the first step, the multiple battery cells and the multiple heat transfer plates are stacked on each other through an adhesive cured after a lapse of a predetermined time, and the second step is performed before the adhesive is cured.

9. The method for manufacturing the battery module according to claim 7, wherein in the first step, the multiple battery cells and the multiple heat transfer plates are stacked on each other through an adhesive cured after a lapse of a predetermined time, and the second step is performed before the adhesive is cured.

10. A battery module comprising:

multiple battery cells stacked on each other;

a spacer provided at an end portion of each battery cell; and a heat transfer plate having a heat absorption portion arranged between the multiple battery cells stacked on each other to absorb heat from the battery cells and a heat dissipation portion dissipating the heat absorbed by the heat absorption portion to an outside, wherein the heat dissipation portion is bent relative to the heat absorption portion, and is exposed through between the battery cells to contact the spacer, the spacer includes a contact portion having a contact surface contacting the heat dissipation portion, and a positioning portion having a surface facing a direction opposite to that of the contact surface and defining a position of the spacer, the spacer further includes a stack portion having a first end surface on a top side in a stack direction and a second end surface on a bottom side in the stack direction and configured such that an interval between the first end surface and the second end surface is set to a battery cell stacking interval, and of the stacked spacer, the first end surface contacts a second end surface of a spacer positioned thereabove, and the second end surface contacts a first end surface of a spacer positioned therebelow.

11. The battery module according to claim 10, wherein in a state in which the second end surface of the spacer positioned above and the first end surface of the spacer positioned below contact each other, a space where the heat transfer plate is arranged is formed in a clearance between the spacers positioned one above the other.

* * * * *